(12) United States Patent
Ward et al.

(10) Patent No.: US 8,858,312 B1
(45) Date of Patent: Oct. 14, 2014

(54) REACTION PROGRAM SYSTEM USING A TRIGGER MECHANISM FOR CUEING USER INTERACTION DURING USE OF A REACTION PROGRAM

(75) Inventors: Kyle A. Ward, Camas, WA (US); Christopher Martin Foy, Kirkland, WA (US)

(73) Assignee: Step Revolution LLC, Camas, WA (US)

( * ) Notice: Subject to any disclaimer, the term of this patent is extended or adjusted under 35 U.S.C. 154(b) by 266 days.

(21) Appl. No.: 13/248,023

(22) Filed: Sep. 28, 2011

Related U.S. Application Data

(60) Provisional application No. 61/387,425, filed on Sep. 28, 2010.

(51) Int. Cl.
*A63F 13/00* (2014.01)

(52) U.S. Cl.
USPC ......... 463/7; 463/30; 463/33; 463/36; 463/37

(58) Field of Classification Search
USPC ...................................... 463/7, 30, 33, 36, 37
See application file for complete search history.

(56) References Cited

U.S. PATENT DOCUMENTS

| | | | |
|---|---|---|---|
| 2,402,109 A | 6/1946 | Williams | |
| 2,605,557 A | 4/1952 | Van Deventer | |
| 3,233,341 A | 2/1966 | Exton, Jr. | |
| 4,720,789 A | 1/1988 | Hector et al. | |
| 5,139,261 A | 8/1992 | Openiano | |
| 5,411,271 A * | 5/1995 | Mirando | 463/9 |
| 5,584,779 A | 12/1996 | Knecht et al. | |
| 6,410,835 B2 | 6/2002 | Suzuki et al. | |
| 7,538,760 B2 | 5/2009 | Hotelling et al. | |
| 2004/0263484 A1 * | 12/2004 | Mantysalo et al. | 345/173 |
| 2006/0026536 A1 | 2/2006 | Hotelling et al. | |
| 2006/0287088 A1 | 12/2006 | Mashimo et al. | |
| 2011/0063248 A1 * | 3/2011 | Yoon | 345/174 |

OTHER PUBLICATIONS

Wikipedia, "Dance Aerobics," at least as early as Dec. 19, 2011, 2 pages, http://en.wikipedia.org/wiki/Dance_Aerobics, Wikipedia Foundation, Inc.
PIANOCHAMPION90, "Dance Aerobics: FAQ," last updated Sep. 14, 2007, 4 pages, GameFAQs.com, http://www.gamefaqs.com/nes/587213-dance-aerobics/faqs/50135, CBS Interactive Inc.
Wikipedia, "PaRappa the Rapper," at least as early as Dec. 19, 2011, 7 pages, http://en.wikipedia.org/wiki/PaRappa_the_Rapper, Wikipedia Foundation, Inc.
Uyeyama, Richard, "Parappa the Rapper (SCEA/SCEI, Music/Rhythm Game, PSX) Informational Guide, Including Patterns and Pattern Tips V1.2," last updated Dec. 24, 2000, 6 pages, GameFAQs.com, http://www.gamefaqs.com/ps/198264-parappa-the-rapper/faqs/4074, CBS Interactive Inc.

* cited by examiner

*Primary Examiner* — James S McClellan
(74) *Attorney, Agent, or Firm* — Law Office of Karen Dana Oster, LLC

(57) ABSTRACT

A reaction program system including a reaction program implemented on a reaction system platform, the reaction system platform including a computer, a display device, and a user interface device.

22 Claims, 16 Drawing Sheets

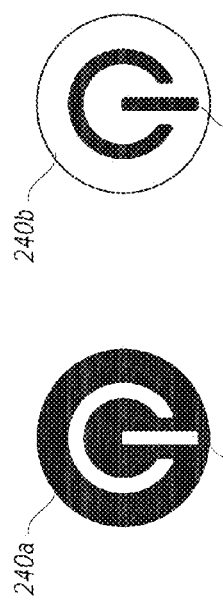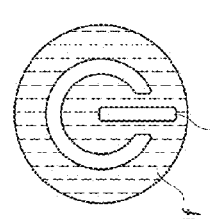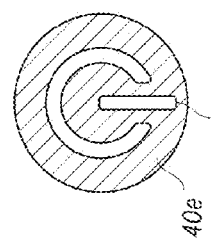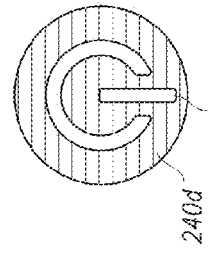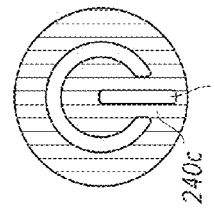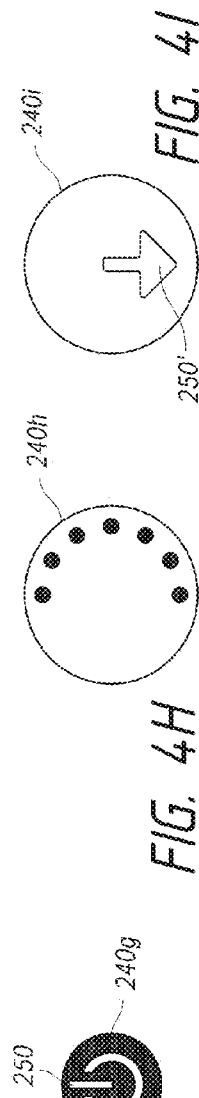

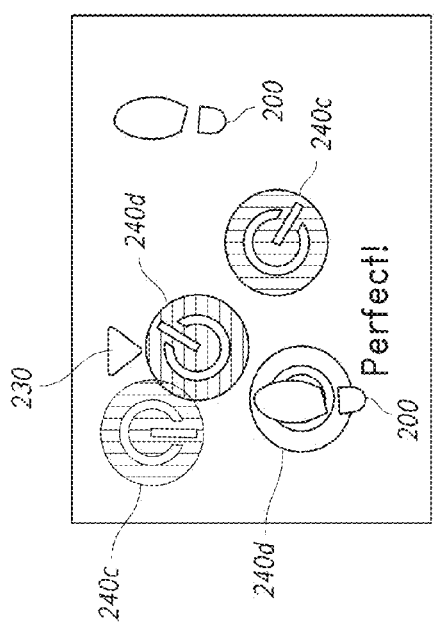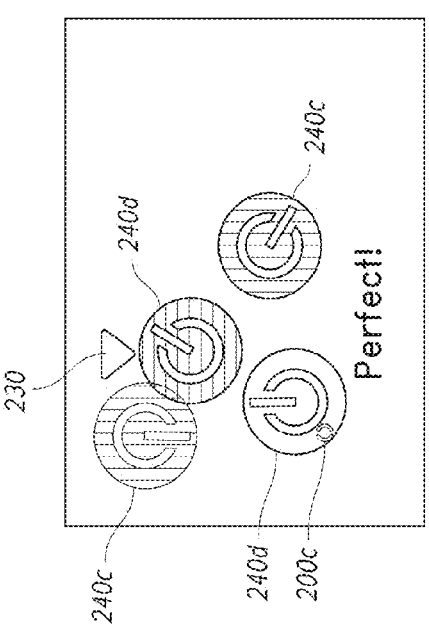

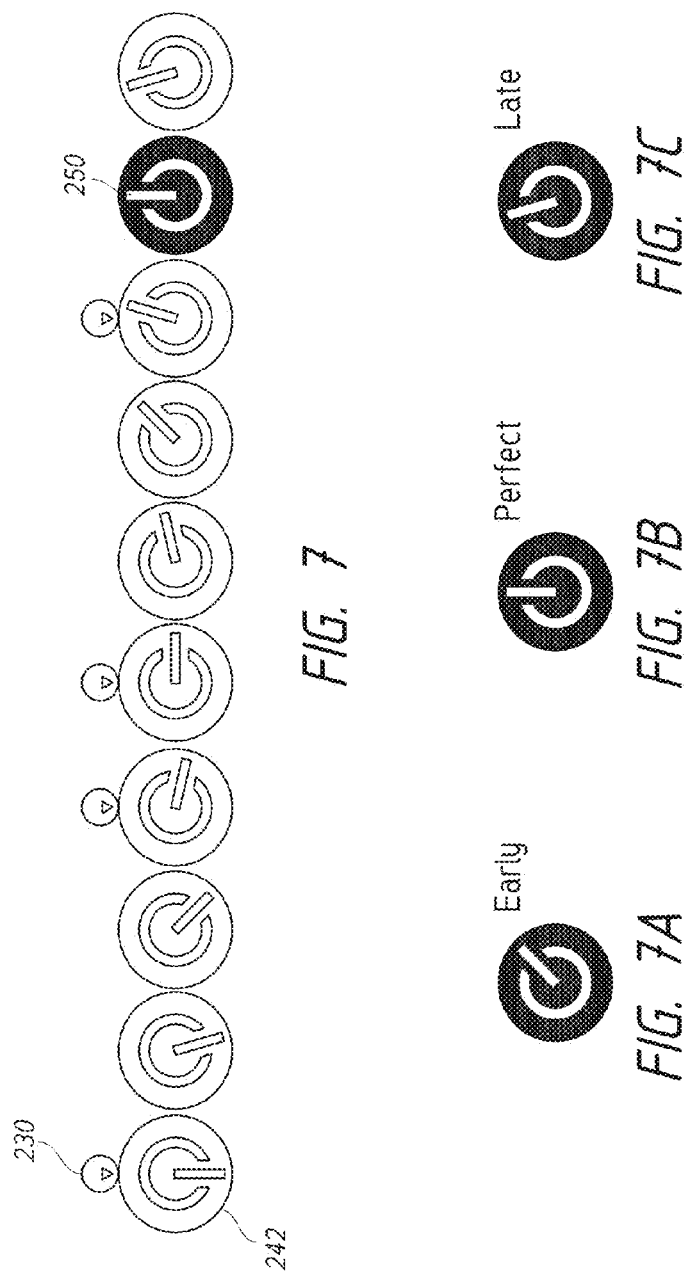

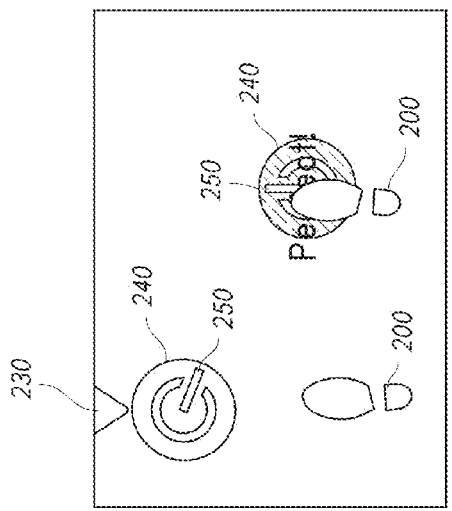
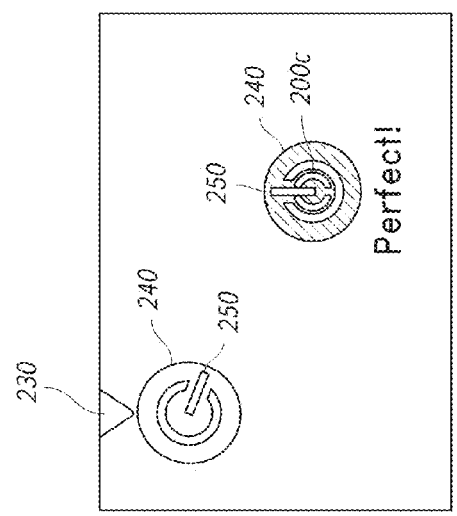

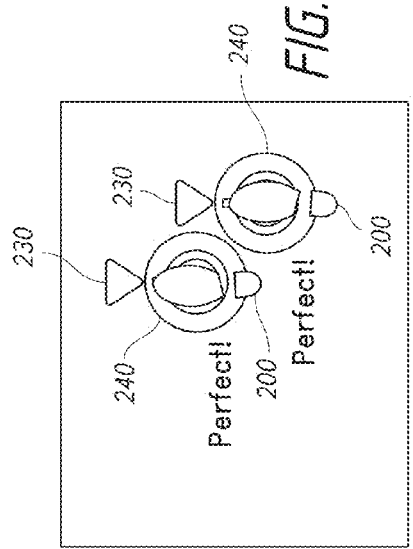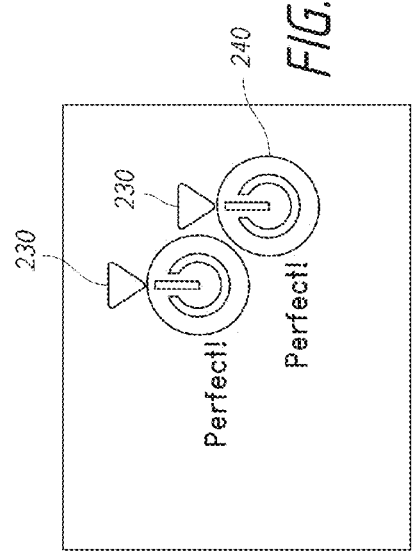

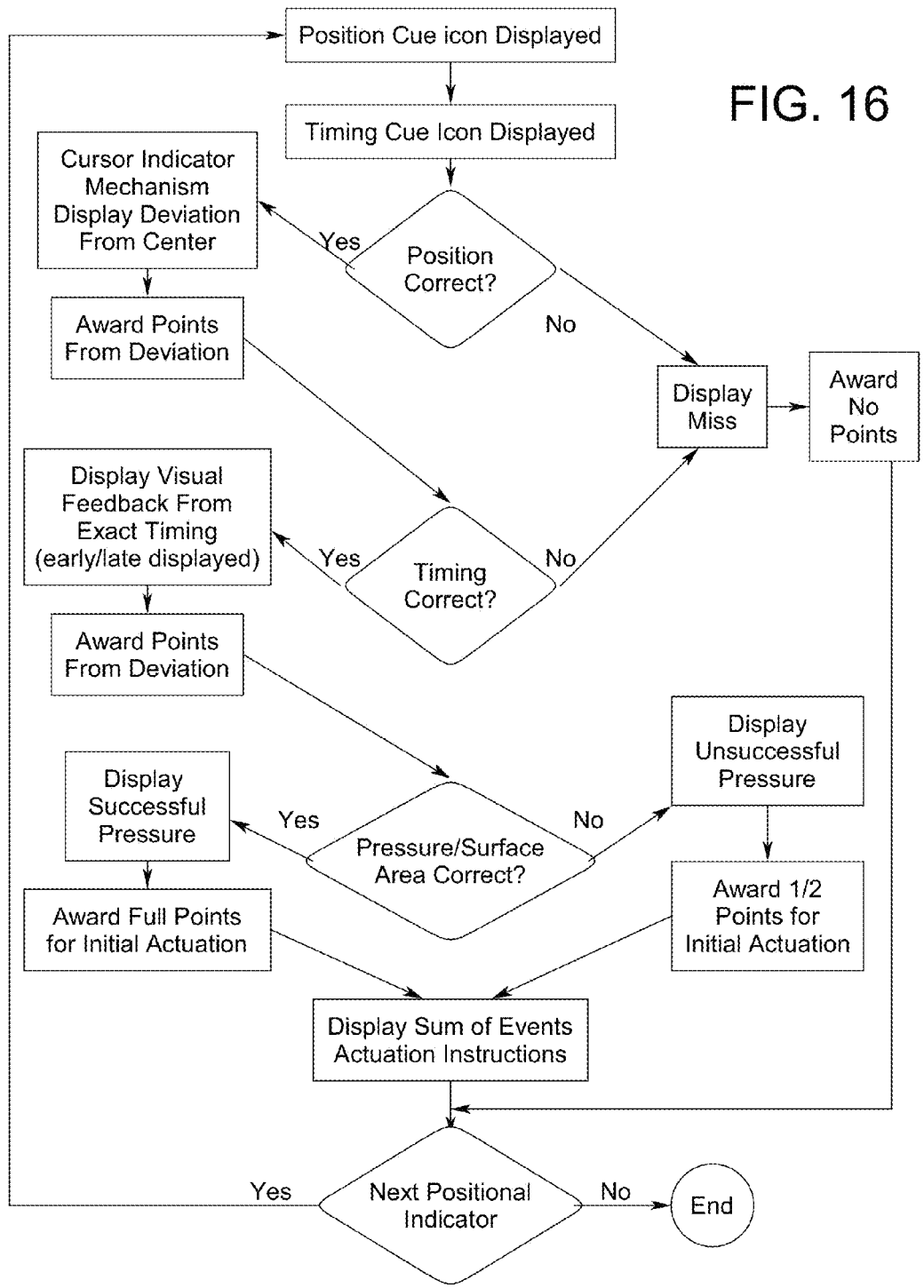

REACTION PROGRAM SYSTEM USING A TRIGGER MECHANISM FOR CUEING USER INTERACTION DURING USE OF A REACTION PROGRAM

The present application is an application claiming the benefit of U.S. Provisional Patent Application No. 61/387,425, filed Sep. 28, 2010. The present application is based on and claims priority from this application, the disclosure of which is hereby expressly incorporated herein by reference in its entirety.

COPYRIGHT NOTICE

A portion of the disclosure of this patent document contains material which is subject to copyright protection. The copyright owner has no objection to the facsimile reproduction of the patent disclosure as it appears in the Patent and Trademark Office patent files or records, but otherwise reserves all copyright rights whatsoever.

FIELD OF THE INVENTION

Described herein is a reaction program system that includes a trigger mechanism for cueing user interaction during use of a reaction program implemented on a reaction system platform.

BACKGROUND OF INVENTION

The following references describe technology that may generally relate to and/or provide background for the technology described herein.

U.S. Pat. No. 4,720,789 to Hector et al. (the "Hector reference") discloses a video exercise or game floor controller with position indicating foot pads. The Hector reference teaches operation of a video game or an exercise system utilizing a video display that is enhanced by a floor controller utilizing weight sensitive pads that allow an operator to input information into the system by locating his feet in specific portions of the floor controller. The system includes an interface circuit which obtains foot location signals from the floor controller and transmits this information to a system microprocessor which in turn is used to control the video display.

U.S. Pat. No. 5,139,261 to Openiano (the "Openiano reference") discloses a foot-actuated computer game controller serving as a joystick. The Openiano reference teaches a controller that is electrically interfaced to a video game computer or the like. The controller is selectively actuated by discrete motions and forces, the locations, magnitudes, and orientations of which are variably predetermined by the user. Pressure or proximity sensor units are independently placeable upon any surface, and normally upon a floor. The signals produced by the sensors are received by a video game control unit and used to produce electrical signals suitable to be received by a conventional video game computer or the like for the purpose of controlling the progression of the video game.

U.S. Pat. No. 5,584,779 to Knecht et al. (the "Knecht reference") discloses a step exercising system for choreographing an aerobic step workout. The system includes step support structure including a plurality of spaced-apart step surfaces, a cueing device for indicating to the user on which step surfaces to step, and a controller coupled to the cueing device and constructed and arranged to activate the cueing device to indicate to the user an ordered sequence of step surfaces to step on, thereby choreographing an aerobic step workout for the user.

U.S. Pat. No. 2,402,109 to Williams (the "Williams reference") discloses a device for teaching and dancing that uses a series of blocks that are lit inside of a floor to instruct users to follow various dance patterns. "Said signal will indicate when the particular block is danced upon, the next immediate position in the proper series of steps." Therefore, the Williams reference disclosed a platform with actuatable parts. The lights and actuations provide the ability to interact with the user by indicating a step out of sequence by the "ring of a bell."

U.S. Pat. No. 2,605,557 to Van Deventer (the "Van Deventer reference") discloses a method of and apparatus for teaching dancing. The disclosed apparatus provides a guide and "assist tick" track to which the users hear and react. The Van Deventer reference also provides "signals to indicate successive foot steps to be taken in timed relation to music." Therefore, it is a method and apparatus for "following" instructions with regard to music timing.

U.S. Pat. No. 3,233,341 to Exton, Jr. (the "Exton reference") discloses a method of and apparatus for the direction of the placement of objects, and provides a "non real-time" interaction with users in timed relation to music. The Exton reference was one of the first that provided a way to evaluate users based on their performance to the music sequence. Additionally, this is one of the first references that had the ability to direct a user to locations with visual signals that also indicated proper placement upon a surface and later provided a system of evaluating the user by comparisons of proper placement to actual placement (in regard to timed relation to the music).

U.S. Pat. No. 6,410,835 to Suzuki et al. (the "Suzuki reference") a dance game apparatus and step-on base for dance games having a floor panel construction capable of stimulating rhythm sensation in time to the music stepping according to the contents which are instructed in sequence.

U.S. Patent Application No. 2006/0287088 to Mashimo et al. (the "Mashimo reference") discloses a storage medium storing game program, game apparatus, and game control method. The Mashimo reference includes an LCD (displaying a game screen) and a touch panel. The game screen presents a marker image so as to be variable in position in time with performance of music, and also presents a timer circle image for indicating touch timing for the marker image. The users' performances are evaluated on the basis of touch timing and position.

U.S. Patent Application No. 2006/0026536 Hotelling et al. (the "Hotelling '536 reference") is directed to methods and systems for processing touch inputs. The Hotelling '536 reference describes reading data from a multipoint sensing device such as a multipoint touch screen where the data pertains to touch input with respect to the multipoint sensing device, and identifying at least one multipoint gesture based on the data from the multipoint sensing device.

U.S. Pat. No. 7,538,760 to Hotelling et al. (the "Hotelling '760 reference") is directed to a force imaging touch pad that includes first and second sets of conductive traces separated by a spring membrane. When a force is applied, the spring membrane deforms moving the two sets of traces closer together. The resulting change in mutual capacitance is used to generate an image indicative of the amount or intensity of the applied force. A combined location and force imaging touch pad includes two sets of drive traces, one set of sense traces and a spring membrane. In operation, one of the drive traces is used in combination with the set of sense traces to generate an image of where one or more objects touch the touch pad. The second set of drive traces is used in combination with the sense traces and spring membrane to generate an image of the applied force's strength or intensity.

In the 1988 Nintendo game "Dance Aerobics," (the "Dance Aerobics reference"), users dance on a dance mat to a series of instructions given by a virtual aerobics instructor. Additionally, this title features music minigames that provide the user with simple instructions to music sequences (for example, "READY" and/or "ACTIVATE"). This was the first software driven dance pad title that provided feedback and "cue" visuals to a user.

The 1996 Sony Computer Entertainment game "PaRappa the Rapper" (the "PaRappa the Rapper reference") features user instructions via two objects (stationary and scrolling). When the scrolling completely overlaps (mates) with the stationary object, the game provides signals for the user to actuate a console controller.

The references cited in this Background are hereby incorporated by reference in their entirety.

BRIEF SUMMARY OF THE INVENTION

Described herein is a reaction program system that includes a trigger mechanism for cueing user interaction during use of a reaction program implemented on a reaction system platform. The trigger mechanism is preferably displayed on a display device to cue user interactions via a user interface device. The reaction program preferably scores user interactions.

Described herein is a preferred reaction program system including a reaction program implemented on a reaction system platform, the reaction system platform including a computer, a display device, and a user interface device. The system includes: a timing cue icon displayed on the display device to cue at least one user interaction via the user interface device during use of the reaction program; the timing cue icon displayed on the display device to provide instructions pertaining to timing of the interaction, timing being visually indicated by the movement of a time hand to a home position; the timing cue icon displayed on the display device to provide instructions pertaining to an X/Y position of the interaction, the X/Y position being visually indicated by the position of the timing cue icon on the display device; a user-controlled cursor indicator mechanism displayed on the display device, the cursor indicator mechanism controlled via the user interface device; wherein the trigger mechanism cues the at least one user interaction between the user-controlled cursor indicator mechanism and the timing cue icon when the time hand reaches the home position.

The system may also include a position cue icon displayed on the display device to provide prior notice of the timing cue icon's position.

The timing cue icon displayed on the display device may provide instructions pertaining to duration of the interaction, the duration being visually indicated by a characteristic of the timing cue icon.

The timing cue icon displayed on the display device may provide instructions pertaining to pressure of the interaction, the pressure being visually indicated by a characteristic of the timing cue icon.

Described herein is another preferred reaction program system including a reaction program implemented on a reaction system platform, the reaction system platform including a computer, a display device, and a user interface device. The system preferably includes: a trigger mechanism displayed on the display device to cue at least one user interaction via the user interface device during use of the reaction program; the trigger mechanism comprising a position cue icon and a timing cue icon; the position cue icon displayed on the display device to provide prior notice of the timing cue icon's position; and the timing cue icon displayed on the display device to provide instructions pertaining to timing of the interaction, timing being visually indicated by the movement of a time hand to a home position; a user-controlled cursor indicator mechanism displayed on the display device, the cursor indicator mechanism controlled via the user interface device; wherein the trigger mechanism cues the at least one user interaction between the user-controlled cursor indicator mechanism and the timing cue icon when the time hand reaches the home position.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

BRIEF DESCRIPTION OF THE SEVERAL VIEWS OF THE DRAWINGS

The accompanying drawings illustrate various exemplary reaction program systems and/or provide teachings by which the various exemplary reaction program systems are more readily understood.

FIGS. 4A to 4I show exemplary timing cue icons.

FIG. 6A is a screenshot of a user-controlled cursor indicator mechanism (represented by two shoes) interacting with multiple "colored" timing cue icons on the display device.

FIG. 6B is a screenshot of the same image as FIG. 6A without a user-controlled cursor indicator mechanism (which has either already actuated the tap-timing cue icon or which is not used because it is an integrated platform), but showing a feedback cursor indicator mechanism.

FIG. 7 shows a series of "snapshots" of a trigger mechanism for the purpose of discussing the timing for user "tap" actuation of a tap-timing cue icon.

FIGS. 7A-7C each show a "frozen" and/or highlighted tap-timing cue icon that has been actuated early (FIG. 7A), on time (FIG. 7B), and late (FIG. 7C).

FIG. 8A is a screenshot of a user-controlled cursor indicator mechanism (represented by two shoes) interacting with a tap-timing cue icon on the right side of the display device, and a new trigger mechanism being presented on the left side of the display device.

FIG. 8B is a screenshot of the same image as FIG. 8A without a user-controlled cursor indicator mechanism (which has either already actuated the tap-timing cue icon or which is not used because it is an integrated platform), but showing a feedback cursor indicator mechanism.

FIG. 13A is a screenshot of a user-controlled cursor indicator mechanism (represented by two shoes) simultaneously actuating two timing cue icons on the display device actuated.

FIG. 13B is a screenshot of the same image as FIG. 13A without the user-controlled cursor indicator mechanism.

FIG. 16 is a flowchart of an exemplary scoring sub-system.

Figure 1:
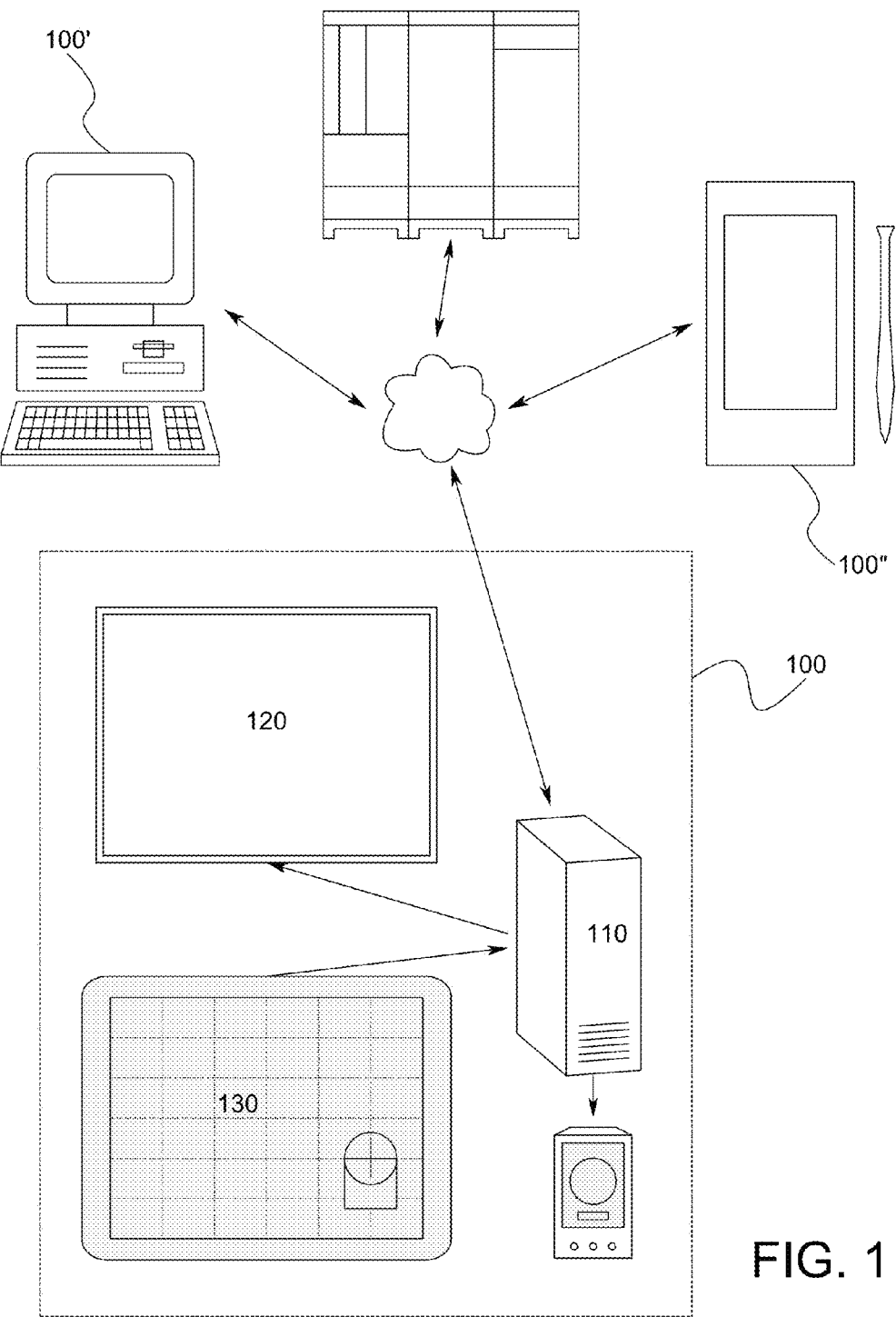
FIG. 1 is a block diagram of an exemplary generic reaction system platform and some additional exemplary reaction system platforms in a wireless network and connected to a server.

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Described herein is a reaction program system that includes a trigger mechanism for cueing user interaction during use of a reaction program implemented on a reaction system platform (including a computer, a display device, and a user interface device). The trigger mechanism is preferably displayed on the display device to cue user interactions (including the position, timing, and/or pressure thereof) via the user interface device. The trigger mechanism includes a position cue icon and a timing cue icon. The reaction program preferably scores user interactions based on position, timing, pressure, and/or accuracy.

Although the reaction program system includes many unique features, the following may be particularly relevant either alone or in combination with each other and other features described herein:

The timing cue icon provides both "get ready" timing instructions (visual countdown) in the form of a rotating time hand and "action now" actuation instructions in the form of the time hand reaching its "home" position and, optionally, a change of one of its characteristics (e.g. a color change). This unique single-element timing cue icon eliminates the need for two timing elements (one stationary and one moving, that overlap to indicate that action is required) that are the hallmark of traditional "piano-style scrolling" systems. Another advantage of the unique single-element timing cue icon is that information (instructions, guidance, and feedback) can share the same interactive screen space without the stationary restrictions of piano-style scrolling systems.

The timing cue icon also may be actuated while it is moving. The user can monitor the moving timing cue icon until cued by the rotating time hand that it is time for actuation. Also, the user can "hold" and "drag" (move) an actuated timing cue icon along a path. Similarly, the user-controlled cursor indicator mechanism is not limited to being fixed or in a stationary location.

A storage-based sequence provides the user with "X/Y position" and reaction/timing guidance or instructions via a timing cue icon (possibly in relation to a position cue icon). The reaction/timing guidance is preferably implemented using "rotation and direction" of the timing cue icon. Optional characteristics (e.g. shape, color, size) may be used to provide additional guidance (e.g. pressure).

Changing characteristics (e.g. shape, color, size) may be used to provide notice (e.g. actuate now) or feedback (e.g. an indication of actuation of the timing cue icon early, on-time, or late) in real-time.

One characteristic (e.g. shapes such as circles, squares, hexagons, or triangles) may be used for each user in a multi-user system. Other characteristics (e.g. size and color) may then be used for purposes such as providing instructions (e.g. duration, pressure/velocity) or feedback (e.g. reaction timing).

Before describing the reaction program system and the figures, some of the terminology should be clarified. Please note that the terms and phrases may have additional definitions and/or examples throughout the specification. Where otherwise not specifically defined, words, phrases, and acronyms are given their ordinary meaning in the art. Exemplary reaction program systems may be better understood with reference to the drawings, but these are not intended to be of a limiting nature. The same reference numbers will be used throughout the drawings and description in this document to refer to the same or like components.

The terms "user" and "users" are defined to include at least one player or user of a reaction program. Users have "skills" that may include detectable and measurable characteristics such as reflexes, sensory (e.g. visual and auditory) perception, manual dexterity (e.g. hand-eye coordination, foot-eye coordination, and/or finger and/or thumb-eye coordination), rhythm (and/or timing), and other "reaction characteristics." The user may demonstrate skills and/or reaction characteristics through "interactions" with a "reaction program." User interactions may be, for example, tactile "touch" interactions (e.g. finger or thumb touches, foot touches (e.g. stepping), or manipulations of user interface (input) devices such as a joystick or a mouse (moving and/or clicking)), sensed interactions (e.g. where the user's movements are sensed such as, for example, as they are sensed by the Nintendo Wii® system), or auditory (e.g. verbal or other sound interactions). The visual representation of user interactions is generally represented on a "reaction system platform" "display device" by the user-controlled "cursor indicator mechanism" interacting with the "reaction program"-controlled "trigger mechanism." The user's interaction may be scored on factors including, but not limited to, position of the interaction (including along a path), timing of the interaction (including the duration), pressure of the interaction, and/or other representations of user skills and reaction characteristics.

The phrase "reaction program" is defined as a program that tests, measures, evaluates, compares, and/or provides feedback (e.g. scores) based on user skills and/or reaction characteristics thereof. The reaction program may be, for example, a reaction game, a reaction trainer, or a reaction exerciser. Users may use the reaction program individually (solo) or together (multiple user) for competition or cooperation. The reaction program can be thought of as a computer program that directs the reaction system platform to perform the following exemplary functions: display trigger mechanisms on the display device; receive signals representative of user interactions from the user interface device; display cursor indicator mechanisms on the display device; display interactions between the display trigger mechanisms and the cursor indicator mechanisms on the display device; score interactions between the display trigger mechanisms and the cursor indicator mechanisms; and provide feedback (preferably in real-time) to the user based on the score.

The phrases "reaction trigger mechanism" and "trigger mechanism" are defined as the "actuating instructions" or commands (usually visual) to the user that indicate an "actuating or triggering event" that instructs the user to perform a specific interaction for correct "actuation." The trigger mechanism may indicate specific actuation area(s), actuation movement (including path(s)), actuation timing, actuation duration, actuation pressure, and/or other "actuation conditions." Multiple trigger mechanisms may be used in sequence to provide multiple actuating instructions. The reaction program may present a trigger mechanism sequence for a predetermined duration (which may be the length of one or more songs) such as the complete sequence is considered a complete unit (e.g. a "game"). The presentation of trigger mechanisms may be synchronized to musical rhythm or auditory sounds to either enhance or replace the visual instructions. (Music is optional and could enhance the user instructions by allowing all instructions and sequences synchronized to an auditory cadence.) The trigger mechanism may include a "position cue icon" and/or a "timing cue icon." The trigger mechanism has three states: a "pre-actuation state," an "actuation state," and a "post-actuation (feedback) state." The term trigger mechanism is also meant to include trigger mechanism sensors for detecting user interactions represented by cursor indicator mechanisms.

The phrase "cursor indicator mechanism" (or shortened phrases such as "cursor indicator" and "cursor") is defined to mean the visual indication(s) of the user's current position(s) and/or action(s) on the display (virtual area). For integrated platforms in which the display device 120 user and interface device 130 are integrated, there is a feedback cursor indicator mechanism 200c that is "created" based on the user's interaction. The phrase "cursor indicator mechanism" is also meant to include cursor indicator mechanism sensors for translating user interactions received from the reaction system platform user interface device(s) into signals usable by the reaction system platform computer.

The phrase "reaction system platform" is defined as a computer (or device associated with a processor) that is associated with a "display device" (or "output device") and "user interface device" (or "input device"). The reaction system platform is discussed in detail below in connection with FIG. 1.

The term "computer" is defined as a device that capable of executing instructions or steps and may be implemented as a programmable logic device or other type of programmable apparatus known or yet to be discovered. The computer may have associated memory (that may store, for example, the reaction program, other data necessary for executing the reaction program, and user scores). The computer may be implemented using a general purpose processor (e.g. microprocessor, controller, microcontroller, or state machine), a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. The computer may be implemented as a single processing unit or as multiple processing units.

The term "memory" is defined to include any type of computer (or other technology)-readable media (also referred to as machine-readable storage medium) including, but not limited to attached storage media (e.g. hard disk drives, network disk drives, servers), internal storage media (e.g. RAM, ROM, EPROM, FLASH-EPROM, or any other memory chip or cartridge), removable storage media (e.g. CDs, DVDs, flash drives, memory cards, floppy disks, flexible disks), firmware, and/or other storage media known or yet to be discovered. Depending on its purpose, the memory may be transitory and/or non-transitory. For example, programs and subprograms are generally stored in non-transitory memory. Memory may be implemented as a single memory unit or as a plurality of separate memory units. Similarly, multiple memories may be combined. The memory may be entirely self-contained in the reaction system platform or some or all of the memory may be remote (e.g. in cases where the reaction system platform is networked with a central server and/or with one or more other reaction system platforms).

The terms "programs" and "subprograms" are defined as a series of instructions that may be implemented as software (i.e. computer program instructions or computer-readable program code) that may be loaded onto a computer to produce a machine, such that the instructions that execute on the computer create structures for implementing the functions described herein or shown in the figures. Further, these programs and subprograms may be loaded onto a computer so that they can direct the computer to function in a particular manner, such that the instructions produce an article of manufacture including instruction structures that implement the function specified in the flow chart block or blocks. The programs and subprograms may also be loaded onto a computer to cause a series of operational steps to be performed on or by the computer to produce a computer implemented process such that the instructions that execute on the computer provide steps for implementing the functions specified in the flow chart block or blocks. The phrase "loaded onto a computer" also includes being loaded into the memory of the computer or a memory associated with or accessible by the computer.

The shown programs and subprograms may be divided into multiple modules or may be combined.

The terms "provide" and "providing" (and variations thereof) are meant to include standard means of provision including "transmit" and "transmitting," but can also be used for non-traditional provisions as long as the data is "received" (which can also mean obtained). The terms "transmit" and "transmitting" (and variations thereof) are meant to include standard means of transmission, but can also be used for non-traditional transmissions as long as the data is "sent." The terms "receive" and "receiving" (and variations thereof) are meant to include standard means of reception, but can also be used for non-traditional methods of obtaining as long as the data is "obtained."

The term "associated" is defined to mean integral or original, retrofitted, attached, functionally connected, or positioned near. For example, if a display (or other component) is associated with a computer (or other technology), the display may be an original display built into the computer, a display that has been retrofitted into the computer, an attached display that is attached to the computer, a display that is functionally connected (e.g. over the internet), and/or a display that is positioned near the computer.

It should be noted that the terms "may," "might," "can," and "could" are used to indicate alternatives and optional features and only should be construed as a limitation if specifically included in the claims. Claims not including a specific limitation should not be construed to include that limitation.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes" and "has" mean "comprises" (e.g. a device that includes, has, or comprises A and B contains A and B, but optionally may contain C or additional components other than A and B). It should be noted that, unless otherwise specified, the singular forms "a," "an," and "the" refer to one or more than one, unless the context clearly dictates otherwise.

Reaction System Platform

As shown in FIG. 1, an exemplary generic reaction system platform 100 (alternative reaction system platforms are designated as 100' and 100") includes a computer 110 (that includes or is associated with a processor) that is associated with a display device 120 and user interface device 130.

The display device 120 preferably presents a visual "virtual area" output (and optionally auditory and/or tactile output) of the reaction program to the users. Exemplary display devices include one or more of the following: a display screen (e.g. computer screens or monitors), a speaker, and/or any other device known or yet to be discovered that is capable of providing visual, auditory, and/or tactile output.

The user interface device 130 receives and "converts" the user's physical skills in interacting with the reaction program into "input" to the reaction program. Many exemplary display devices will be of a graphical X/Y grid on an at least substantially "flat, rectangular surface," but alternative display devices may be three-dimensional and/or have alternative shapes (e.g. spherical, cubical, or polyhedral). Exemplary user interface devices include one or more of the following: a touch screen or multipoint touch screen (that may be associated with the display device 120 such as in handheld gaming devices, tablets, and smart phones), controllers (e.g. a joystick, a computer mouse, keyboard, directional arrow buttons, or console controller), a sensor mat (e.g. touch pads, step pads, and/or any interactive surfaces with input sensors that may be positioned in an array and that the user can activate with, for example, his feet or hands), a microphone, a camera, a motion detector, and/or any other device known or yet to be discovered that is capable of receiving and converting user interaction from physical to "virtual" so that it can be input to the reaction system platform computer 110 (processor) and interpreted by the reaction program.

The display device 120 is preferably coordinated with the user interface device 130. For example, a substantially flat, rectangular (X/Y grid) display screen may be coordinated with a substantially flat, rectangular (X/Y grid) sensor mat; although they may be coordinated via an appropriate ratio (e.g. the sensor mat may have twice the length and twice the width of the display screen).

Some platforms use an integrated display device 120 and user interface device 130. These platforms will be referred to as integrated platforms, examples of which are discussed in relation to FIGS. 6B, 8B, 11B, and 13B. For example, touch screen devices such as those described in the Hotelling '536 reference and the Hotelling '760 reference as well as touch screen amusement devices (e.g. the Nintendo DS®) and many smart phones (e.g. the Apple iPHONE® and the HTC EVO®) could be used as a reaction system platform 100 with an integrated display device 120 and user interface device 130.

Exemplary reaction system platforms include, but are not limited to general purpose computers (e.g. desktop computers 100', laptop computers, and tablet computers 100"), handheld gaming devices (e.g. touch screen amusement devices, touchpad amusement devices, and joystick and/or button amusement devices including, but not limited to, the Sony PSP®, the Nintendo DS®, or a custom handheld gaming device), smart phones (e.g. the Apple iPHONE®, the HTC EVO®, or the Samsung INCREDIBLE®), console video games (e.g. devices designed for game play such as the Nintendo Wii®, the Sony PLAYSATION®, the Microsoft XBOX®, or a custom console video game), kiosk gaming devices (e.g. standalone systems such as those found in arcades), dance or exercise platform amusement devices (e.g. "dance" or "exercise" devices such as the Konami DANCE DANCE REVOLUTION® and the Nintendo Wii FIT®), and/or any computers known or yet to be discovered that are capable of executing a reaction program. It should be noted that the reaction program is versatile in that it may be implemented using most known and yet to be discovered reaction system platforms. The communication and functional interaction between the reaction system platform computer 110 (or processor), display device 120, and/or user interface device 130 are handled using any method known or yet to be discovered.

Trigger Mechanism and Cursor Indicator Mechanism

As set forth, a "cursor indicator mechanism" 200 is the visual indication(s) of the user's current or immediately past position(s) (X/Y location) and/or action(s) on the display device 120 (virtual area). As also set forth, a "trigger mechanism" 220 is the visual instructions to the user to perform (using his cursor indicator mechanism 200 or interaction through a touch screen) at least one specific interaction for correct "actuation." The trigger mechanism may include a "position cue icon" 230 (position indicator) and/or a "timing cue icon" 240 (timing indicator). The reaction program may present (display) the position cue icon 230 to prepare the user for the next timing cue icon 240. The user then interacts (actuates) with the timing cue icon 240 using his cursor indicator mechanism 200. Another position cue icon 230 may appear immediately after a user has actuated a timing cue icon 240. The position cue icon 230 will preferably remain visible approximately 84 ms after the user actuation.

Figure 2A:
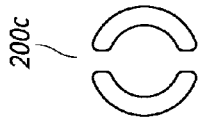
FIGS. 2A and 2B show exemplary cursor indicator mechanisms.
Figure 2B:
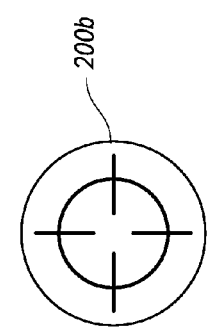

FIGS. 2A and 2B show exemplary cursor indicator mechanisms 200a, 200b (referred to generically using reference number 200). Specifically, FIG. 2A shows an exemplary "two-point" cursor indicator mechanism 200a that might be used with a user interface device 130 (e.g. an interactive floor) that accepts two inputs (e.g. one from each foot). In this example, each "foot" cursor indicator mechanism 200 represents one point of contact on the user interface device 130. Since two feet are shown in FIG. 2A, the user has positioned both feet on the user interface device 130. The shown two-point cursor indicator mechanism 200a is meant for exemplary purposes only. Exemplary alternative two-point cursor indicator mechanisms could have different shapes (e.g. fingerprints, hands, paws, geometric shapes, cross-hairs), sizes, colors, or other distinguishing characteristics. FIG. 2B shows an exemplary "one-point" cursor indicator mechanism 200b that might be used with a user interface device 130 (e.g. a mouse or a joystick) that accepts only one input. In this example, the "cross-hair" cursor indicator mechanism 200b represents a single point of contact on the user interface device 130. Reaction program systems that only had one point of contact might be those implemented on typical desktop computers in which the user interface device 130 is a computer mouse. Exemplary alternative one-point cursor indicator mechanisms could have a different shape (e.g. a foot print, a cross-hair, a fingerprint, a hand, a paw, a geometric shape, an arrow), size, color, or other distinguishing characteristics. Any symbol that can indicate current position can be used.

Figure 2C:
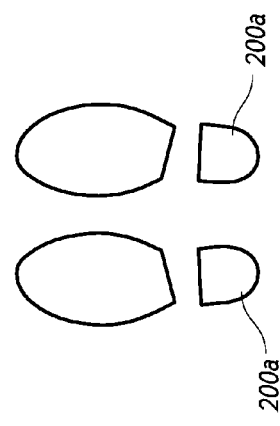
FIG. 2C shows an exemplary feedback cursor indicator mechanism.

FIG. 2C shows an exemplary feedback cursor indicator mechanism 200c that could be used, for example, in integrated platforms in which the display device and user interface device are integral (e.g. touch screen implementations). In these implementations the user is actually making contact (e.g. touching) the timing cue icon 240 (e.g. touch screen). (It should be noted that a feedback cursor indicator mechanism 200c may also be used in combination with cursor indicator mechanisms 200a, 200b such that when the user completes an actuation and "moves on" to the next actuation, the feedback cursor indicator mechanism 200c may remain associated with the timing cue icon 240 to show the relative position between the point of user actuation and the timing cue icon 240.) The feedback cursor indicator mechanism 200c appears directly after the user has made contact. This allows the user to receive feedback as to the proximity of his touch to the center of the timing cue icon 240. FIG. 6B shows the feedback cursor indicator mechanism 200c toward the periphery of the timing cue icon 240. The feedback cursor indicator mechanism 200c might have a characteristic (e.g. color) that provides additional visual feedback that although the timing of the actuation might have been "perfect," the positioning was not. FIG. 8B shows the feedback cursor indicator mechanism 200c substantially coextensive with the center of the timing cue icon 240. The feedback cursor indicator mechanism 200c might have a characteristic (e.g. color) that provides additional visual feedback that both the timing of the actuation and the positioning were "perfect." Exemplary alternative feedback cursor indicator mechanisms 200c could have different shapes (e.g. foot prints, cross-hairs, fingerprints, hands, paws, geometric shapes, arrows), size, color, or other distinguishing characteristics. Any symbol that can indicate past placement can be used.

One preferred function of the cursor indicator mechanism 200 is to visually indicate to the user the area (virtual area or position) last actuated. In other words, the cursor indicator mechanism 200 shows the user's relative position on the display device 120. The cursor indicator mechanism 200 may be directly under the user's finger on a touch screen device, but for devices not having a touch screen display device 120 the cursor indicator mechanism 200 allows the user to orient himself relative to the trigger mechanism 220. Another preferred function of the cursor indicator mechanism 200 is to provide feedback (e.g. visually indicate) regarding the user's interaction with the trigger mechanism 220. By delaying the fading or disappearance of the cursor indicator mechanism 200, the user can see the relative spacing between the cursor indicator mechanism 200 and the trigger mechanism 220.

Figure 3A:
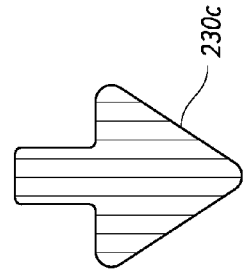
FIGS. 3A to 3C show exemplary position cue icons.
Figure 3B:
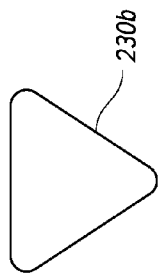
Figure 3C:
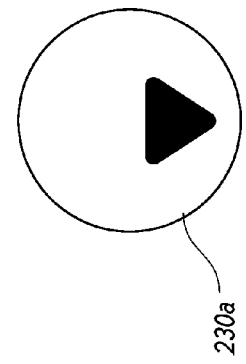

FIGS. 3A-3C show exemplary position cue icons 230a-230c (referred to generically using reference number 230) of the trigger mechanism 220. A preferred function of the position cue icons 230 is to direct the user's attention towards the next location at which the timing cue icon 240 will be presented. When both are visible, a position cue icon 230 and its associated timing cue icon 240 are preferably substantially adjacent to each other. FIG. 3A shows a circular-shaped position cue icon 230a (which may be the default position cue icon 230). The shown position cue icon 230a has an optional additional upside-down triangular-shaped symbol thereon. The entire position cue icon 230a may "blink" or the symbol thereon may "blink." The shown triangular-shaped symbol may be replaced with other shapes or, alternatively, a number may be used to indicate "stacked" trigger mechanisms 220. FIGS. 3B and 3C show an upside-down triangular-shaped position cue icon 230b and an arrow-shaped position cue icon 230c, respectively. These position cue icons 230b, 230c may also "blink." FIG. 3C shows that the position cue icons 230 could be colored (e.g. shown with "red" vertical hashing). Alternative position cue icons 230 could have different shapes, sizes, colors, or other characteristics. As will be discussed below, characteristics can be used to provide instructions and/or notify the user of properties. Any symbol that can indicate a next location can be used.

To aid the user in identifying the position of the next instructions, a position cue icon 230 graphic will appear prior to the timing cue icon 240. This symbol directs the user(s) attention towards the NEXT timing cue icon 240 instruction in the sequence (as seen below).

The position cue icon 230 will appear as soon as the most recent timing cue icon 240 begins to blink or fade out. The position cue icon 230 preferably disappears when user actuates the tap and/or before the timing cue icon 240 reaches the home position. In most cases, the position cue icon 230 will appear before the next timing cue icon 240. It is possible, however, that with fast instructions, a next position cue icon 230 may be visible at the same time as the next timing cue icon 240. The position cue icon 230 is shown as significantly smaller than (approximately ¼ the diameter of) the timing cue icon 240.

Preferred reaction program systems may present (show or display) the position cue icon 230 prior to the appearance of the associated timing cue icon 240. Alternatively, the position cue icon 230 may be presented after the timing cue icon 240. For example, several timing cue icons 240 may be displayed simultaneously or in quick succession with the position cue icons 230 being used to designate which timing cue icon 240 should be actuated next. Another example is that the position cue icon 230 might be presented just before the time hand 250 reaches its home position as an additional visual alert of the need to actuate the timing cue icon 240 or to distinguish the timing cue icon 240 that is to be actuated from other timing cue icons 240 that may be visible on the display device 120. Yet another alternative is to omit a position cue icon 230 or make it a user-selectable option. The omission of a position cue icon 230 might increase the difficulty of the reaction program because there would not be advance notice of the location of where the timing cue icon 240 will appear. Still another alternative is to use another means for cueing the user that a timing cue icon 240 was about to appear in a particular position.

FIGS. 4A-4I show exemplary timing cue icons 240a-240i and (sometimes referred to as "tap indicators" or "timing cue icons" and referred to generically using reference number 240) that are displayed on the display device 120. The function of the timing cue icons 240 is to provide instructions (e.g. visual instructions) pertaining to position, timing, duration, and/or pressure for the user interactions. Each timing cue icon 240 is uniquely self-contained. It provides all the necessary actuation instructions to the user including, but not limited to, position, timing, pressure and/or feedback. The position cue icon 230 is used primarily for directing the user's attention to the next position of the timing cue icon 240 (although the position cue icon 230 can provide additional information such as the type of timing cue icon 240 that will be appearing). Alternative reaction programs can be implemented omitting the position cue icon 230.

FIGS. 4A-4G show exemplary timing cue icons 240 having substantially centrally-located rotating "power symbols" that include an open circle (or an almost closed "C" shape) and a "time hand" 250 (similar to the "hand" on a clock) that is shown as at least slightly protruding from the opening in the circle. Alternative symbols include, but are not limited to, a series of "dots" that disappear (FIG. 4H), a time hand 250' without the open circle (FIG. 4I), a "dot" or other mark that traverses the outer periphery of the timing cue icons 240 (not shown), or any other symbol that clearly shows the passage of time. The timing cue icons 240 represent the "core" concept of actuating. These timing cue icons 240 also resemble "virtual countdown" clocks that start from a beginning position (e.g. 6:00—vertical pointing downward) and rotate towards a home position (e.g. 12:00—vertical pointing upward). Any symbol that can be rotated (or has a portion thereof that can be rotated) to indicate timing of actuation can be used. The rotation of the shown timing cue icons 240 with time hands 250 provides a visual countdown instruction for the user to actuate the timing cue icons 240 when the time hand 250 arrives at the home position.

Each timing cue icon 240 has a plurality of "characteristics" including, but not limited to, color, size, shape, consistency (e.g. blinking), transparency/opacity, brightness (or highlighting), and any other characteristic that can be used to distinguish between two icons. Associated sounds may also be considered characteristics. Each characteristic is preferably assigned "values" (e.g. one for each color, or a range based on size) with "meanings" (that may be, for example, properties) that relate to instructions, notice, properties, feedback, or user identity. For example, timing cue icons 240 may flash with a distinctive brightness or change color (e.g. change from black as shown in FIG. 4A to white FIG. 4B) to notify the user that it is time to interact with the timing cue icon 240 for actuation ("activate" time) or to provide the user with feedback that the position cue icon 230 has been successfully actuated. Another example is that the timing cue icons 240 may be colored (see timing cue icons 240c-240f in FIGS. 4C-4F) such that each color represents different properties (e.g. a quarter note or an eighth note). Size (compare the size of the timing cue icon 240a (FIG. 2A) with the size of the timing cue icon 240g (FIG. 2G)) can be used to instruct the user to use more or less pressure. Yet another example is that different shapes (e.g. a circular-shaped timing cue icon 240' (FIG. 5A), a square-shaped timing cue icon 240" (FIG. 5B), and/or a hexagon-shaped timing cue icon 240''' (FIG. 5C)) may be used to distinguish multiple users. The values of the characteristics disclosed herein are meant to be exemplary and are not meant to be limited to those disclosed. For example, colors could be used to distinguish multiple users and shapes can be used to distinguish properties.

Figure 5C:
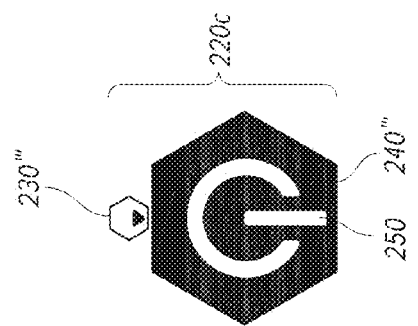
FIGS. 5A-5C show exemplary trigger mechanisms of different shapes, each position cue icon having a shape consistent with its respective timing cue icon.
Figure 5B:
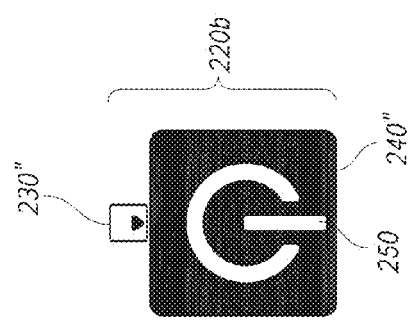
Figure 5A:
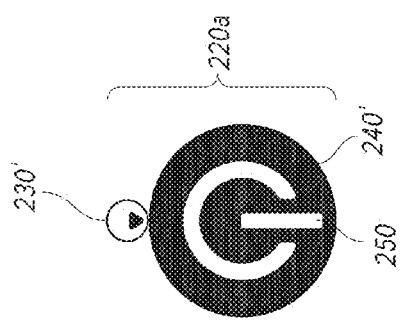

Each trigger mechanism 220 includes a position cue icon 230 and/or a timing cue icon 240. As shown in FIGS. 5A-5C, the trigger mechanisms 220a-220c preferably have position cue icons 230 (shown as position cue icons 230', 230'', and 230''') and the timing cue icons 240 (shown as timing cue icons 240', 240'', and 240''') that have corresponding shapes. For example, FIG. 5A shows a trigger mechanism 220a with a circular-shaped position cue icon 230' and a circular-shaped timing cue icon 240', FIG. 5B shows a trigger mechanism 220b with a square-shaped position cue icon 230'' and a square-shaped timing cue icon 240'', and FIG. 5C shows a trigger mechanism 220c with a hexagon-shaped position cue icon 230''' and a hexagon-shaped timing cue icon 240'''. This is particularly advantageous for reaction program systems that permit multiple users or inputs or when sharing an input surface/device.

The trigger mechanisms 220 and the characteristics thereof may indicate specific actuation area(s), actuation movement (including path(s)), actuation timing, actuation duration, actuation pressure, and/or other "actuation conditions." When the cursor indicator mechanism 200 interacts with the trigger mechanism 220, the trigger mechanism 220 is actuated. Multiple trigger mechanisms may be used in sequence to provide multiple actuating instructions. The reaction program may present a trigger mechanism sequence for a predetermined duration such as the complete sequence is considered a complete unit (e.g. a "game").

The reaction program as described herein uses the exemplary characteristic of color to assign musical note-like properties (based on note types that relate to musical theory) to the timing cue icons 240. A musician might think of the timing cue icons 240 as musical notes with a different color for each note. The values and meanings/properties may be assigned as follows:

| Value | Meaning/Property |
| --- | --- |
| "red" (shown as vertical hashing) timing cue icon 240c | represents one quarter note |
| "blue" (shown as horizontal hashing) timing cue icon 240d | represents one 8th note (half the duration of a musical quarter note) |
| "green" (shown as diagonal vertical hashing) timing cue icon 240e | represents one 16th note (half the duration of a musical 8th note) |
| "purple" (shown as dashed vertical hashing) timing cue icon 240f | represents one 12th note or better known as a "triplet" in musical theory |

The timing cue icon's duration on the display device 120 is not necessarily affected by the note type. FIGS. 6A and 6B both show multiple colored timing cue icons 240c, 240d on the display device 120. The colored timing cue icons 240c, 240d instruct the user to interact with a sequence of eighth notes and quarter notes. FIG. 6A includes a depiction of the user-controlled cursor indicator mechanism. FIG. 6B omits the user-controlled cursor indicator mechanism which may not be needed for implementations in which the display device 120 and user interface device 130 are integral (e.g. touch screen implementations).

In addition to "colored note" types, there may be variations in color intensity characteristics (e.g. light and dark). Each colored note type may have, for example, two color variants, a light version and a dark version. The variants may be used to distinguish multiple sequential colored timing cue icons 240 or for some other purpose.

The reaction program as described herein uses the exemplary characteristic of size to assign "pressure properties" to the timing cue icons 240 (or the actuation area thereof). The amount of pressure may be measured by the display device 120, user interface device 130 (which may include a velocity-surface area), and/or computer 110 of the reaction system platform 100. (The force imaging touch pad described in the Hotelling '760 reference is an example of a platform that may be adapted to enable this feature.) The values and meanings/properties may be assigned as follows:

| Value | Meaning/Property |
| --- | --- |
| small timing cue icon 240g (FIG. 4G) | light pressure tap |
| medium timing cue icon 240a (FIG. 4A) | regular pressure tap |
| large timing cue icon (not shown) | hard pressure tap |

As an alternative to measuring pressure (or velocity) based on the size of the timing cue icon 240, is to measure a single v. a collective hit based on the size of the timing cue icon 240. In such case the values and meanings/properties may be assigned as follows:

| Value | Meaning/Property |
| --- | --- |
| small timing cue icon 240g (FIG. 4G) | one figure tap (actuating with a single cursor indicator mechanism 200) |
| "large" timing cue icon 240a (FIG. 4A) | two figure tap (collectively actuating with both cursor indicator mechanisms 200) |

Collective actuation may be particularly suitable for use with multiple user implementations. The reaction program (and/or the reaction program system) is preferably able to evaluate the pressure to determine if the user provided the pressure that he was instructed to provide. Feedback pertaining to the pressure/velocity may be provided to the user by the size (or other characteristic) of the feedback cursor indicator mechanism 200c. This would allow the user to visually see how much pressure was applied. For example, if the pressure is correct, the feedback cursor indicator mechanism 200c would be the same size as the timing cue icon 240; if the pressure was too hard, the feedback cursor indicator mechanism 200c would be larger than the timing cue icon 240; and if the pressure was too light, the feedback cursor indicator mechanism 200c would be the same size as the timing cue icon 240.

Multiple User Reaction Program Systems:

Although discussed throughout this description primarily in terms of a single user system, it should be noted that the reaction program may be used by multiple users simultaneously (at the same time—either on the same user interface device 130 or on separate user interface devices 130) or alternatively (taking turns either on the same user interface device 130 or on separate user interface devices 130). This would allow for competition based on scores. Alternatively, this would allow for multiple users to play as a team.

A multiple-user reaction program could be implemented, for example, by using distinctive trigger mechanisms 220 (e.g. combinations of the position cue icon 230 and the timing cue icon 240). The distinctiveness may be based, for example, on shape (e.g. circle, square, triangular, hexagon), color, size, or any other characteristic that can be distinctive. See FIGS. 5A-5B. Similarly, the cursor indicator mechanism 200 could be implemented, for example, by using distinctive cursor indicator mechanisms 200 for each user. The distinctiveness may be based, for example, on shape (e.g. foot print, crosshair, hand), color, size, or any other characteristic that can be distinctive. See FIGS. 5A-5B.

Using distinctive trigger mechanisms and distinctive cursor indicator mechanisms 200 provide an additional process of instruction for specific user/input actuation via this combination of guidance instructions if multiple users are sharing a single input interface.

Reaction Program—Constructs, States, Cycles, and Sequences

The object of the reaction program is for a user to "react" to trigger mechanisms 220 as they appear on a display device 120 of a reaction system platform 100 by causing his user-controlled cursor indicator mechanism 200 to interact with the trigger mechanisms 220 by manipulating or interacting with the user interface device 130. Based on the user's interactions, the reaction program provides a score reflecting the user's reactions. The proper (or "correct") actuation of the trigger mechanisms 220, when the time hand 250 reaches the home position (e.g. upward, although this may be adjustable), may be synchronized with music to provide the user with auditory instructions in conjunction with visual instructions. Points are awarded based on the user's timing, position, and applied pressure to the instructed areas (the trigger mechanisms 220).

The reaction program uses six basic constructs. These six constructs are independent of each other, although they can be used together. The constructs can be thought of as falling into three basic states: a "pre-actuation state," an "actuation state," and a "post-actuation" or "feedback state." A "cycle" is a trigger mechanism 220 passing though the three states.

Construct #1: In real-time, displaying (usually visually) the user's current X/Y position in relation to a "target" (trigger mechanism 220). This is usually accomplished using a cursor indicator mechanism 200 on the display device 120. This most likely occurs during the pre-actuation state.

Construct #2: Displaying (usually visually) on the display device 120 a position cue icon 230 showing the next X/Y position/location at which the timing cue icon 240 (instruction) will appear. It should be noted that the position cue icon 230 may "flash" on (appear) and off (disappear). Alternatively, a portion (e.g. an arrow) of the position cue icon 230 may "flash" on (appear) and off (disappear). This most likely occurs during the pre-actuation state.

Construct #3: Displaying (usually visually) on the display device 120 at the X/Y position/location designated by the position cue icon 230 a timing cue icon 240 having a pressure/surface area with which the user is to interact. This most likely occurs during pre-actuation state.

Construct #4: Displaying (usually visually) a reaction time duration ("get ready" timing) until actuation on the display device 120. This is usually accomplished using the timing cue icon 240 and rotating it so the "time hand" 250 rotates from an initial position (representing the start of the duration) to a final or actuation position (representing the end of the duration at which time the user should actuate the trigger mechanism 220). (It should be noted that although the entire timing cue icon 240 is described as rotating, alternatively just the symbol with the time hand 250 can rotate.) The actuations of trigger mechanisms 220 may, optionally, be timed to correspond with music. The display of the reaction time duration most likely occurs during the pre-actuation state. The actual actuation is preferably the actuation state.

Construct #5: Displaying (usually visually) real-time visual feedback after the timing cue icon 240 has been user actuated (e.g. by showing the timing cue icon 240 "freezing in place"). This most likely occurs during the post-actuation state.

Construct #6: Displaying (usually visually) scoring such as a total of successive or missed actuation points as directed by the sequence. This most likely occurs during the post-actuation state.

The trigger mechanisms 220 (both the position cue icons 230 and the timing cue icon 240) may be used to instruct the user to perform various types of actuations including "taps," "holds," "follows," and/or "tracks." These taps, holds, follows, and tracks may be implemented individually (e.g. single taps, holds, follows, and/or tracks), in sequence (e.g. double or triple taps, holds, follows, and/or tracks occurring one right after another), simultaneously (omni) (e.g. simultaneous taps, holds, follows, and/or tracks), and/or various combinations thereof. It should be noted that alternative reaction programs can implement the "taps," "holds," "follows," and/or "tracks" without the position cue icons 230. It should also be noted that alternative reaction programs can use "words" or "text" to provide the user additional instructions, although such text would mostly be used for beginners who had not learned to "read" the timing cue icon 240.

FIGS. 7, 9, 10A, 10B, 14, and 15A-15D each show a cycle in which at least one trigger mechanism 220 (position cue icons 230 and/or timing cue icons 240) progresses through the states and constructs. Although shown as a series of trigger mechanisms 220 in the figures, each figure actually represents only one or two trigger mechanism(s) 220 going through a cycle. The multiple representations are meant to be "snapshots" of the trigger mechanism(s) 220 as it progresses through the cycle. On an actual display device 120, each timing cue icon 240 would appear to rotate.

Figure 11A:
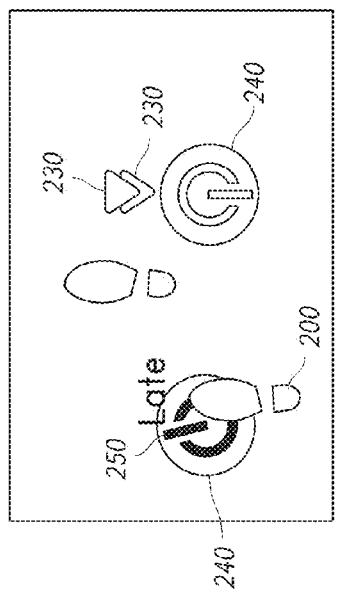
FIG. 11A is a screenshot of a user-controlled cursor indicator mechanism (represented by two shoes) interacting with timing cue icons on the display device, one of the user-controlled cursor indicator mechanisms (on the left side of the display device) is shown as interacting "late" with a tap-timing cue icon, a set of stacked trigger mechanisms (shown on the right side of the display device) that may be sequentially actuated.
Figure 11B:
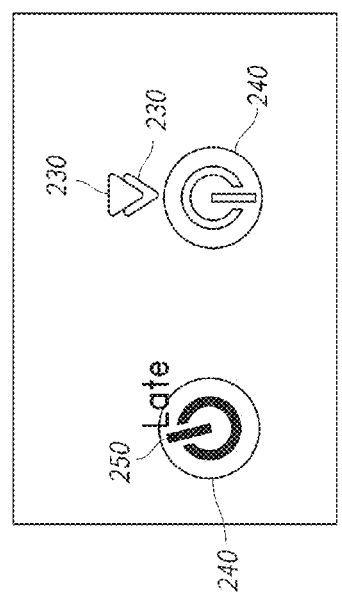
FIG. 11B is a screenshot of the same image as FIG. 11A without the user-controlled cursor indicator mechanism.

FIGS. 8A and 8B are referred to generally as FIG. 8, FIGS. 11A and 11B are referred to generally as FIG. 11, and FIGS. 13A and 13B are referred to generally as FIG. 13. The "A" versions of these figures include a depiction of the user-controlled cursor indicator mechanism 200. The "B" versions of these figures omit the user-controlled cursor indicator mechanism 200 which may not be needed for implementations in which the display device 120 and user interface device 130 are integral (e.g. touch screen implementations).

FIG. 7 is provided to facilitate a discussion of the timing for user actuation of a tap-timing cue icon 242 by causing his cursor indicator mechanism 200 to interact with (in this case, "tap") the tap-timing cue icon 242. A tap-timing cue icon 242 may have a special color, size, shape, label, or other characteristic to distinguish it from other timing cue icons 240. This figure shows a trigger mechanism 220 with a rotating tap-timing cue icon 242 (e.g. a clock "power symbol") (construct #3). The first (leftmost) depiction of the tap-timing cue icon 242 shows the time hand 250 in an exemplary beginning position (shown as "6:00"). In each subsequent depiction in the series, the time hand 250 rotates counter clockwise (towards a home position that may be, for example, 12:00) to countdown "remaining time" (construct #4). In the ninth depiction, the tap-timing cue icon 242 has the time hand 250 positioned in the home position. The tap-timing cue icon 242 may be shaded or in a different "color" such that it further alerts and provides further instructions to the user. The user should actuate the tap-timing cue icon 242 when the time hand 250 is in this home position. The tenth depiction of the tap-timing cue icon 242 shows the time hand 250 past the home position (in the 11:00 position) (construct #5). This provides immediate feedback to the user that he was either late in actuating the tap-timing cue icon 242 or that he did not actuate it at all. (The color change at the home position is optional and may only happen if the user did not actuate the tap-timing cue icon 242 in a timely fashion.) Additionally, the tap-timing cue icon 242 is interactive with the user's actuation. If the user actuates the tap-timing cue icon 242 early, the "clock" (shown as the "power symbol") will stop rotation at the point the user actuated it. This means that the user's interaction has a direct effect on the duration of the tap-timing cue icon 242. "Early" would stop the rotation before the time hand 250 reached the home position (FIG. 7A), "on-time" would stop the rotation when the time hand 250 reached the home position (FIG. 7B), and "late" would stop the rotation after the time hand 250 reached the home position (FIG. 7C). The tap-timing cue icon 242 (or any timing cue icon) could be frozen and/or highlighted in the position at the time of actuation.

In addition to the tap-timing cue icon 242, FIG. 7 also shows the position cue icon 230 "blinking" (being only associated with some of the depictions) either in a regular cadence, synchronized to music, or based on the "pacing" from the visualizations to show a conductor reference and provide attention towards the next set of instructions. Preferably the position cue icon 230 is not interacting with the tap-timing cue icon 242. Also, the position cue icon 230 is preferably absent in the ninth or tenth depictions as a new position cue icon 230 would be used on the display device 120 to alert the user of the position of a new trigger mechanism 220. As noted, the position cue icon 230 is independent from the tap-timing cue icon 242. Alternative reaction programs could omit the use of the position cue icon 230.

FIG. 8A, on the right side, shows the user-controlled cursor indicator mechanism 200 (represented by two shoes) interacting with the tap-timing cue icon 242 as it completes its rotation and, optionally, changes color. The position cue icon 230 readies the user to transition to the next position at the upper left side. The user of the reaction program system may be using an interactive floor platform user interface device 130. Each of his feet is represented by a cursor indicator mechanism 200 (shown as two shoes, one for each point of contact). This provides the user with a visual reference to where his feet are currently located in the virtual space of display device 120. Additionally, the user can see how far/close he was to the tap-timing cue icon 242 thus, providing real-time position feedback.

Figure 9:
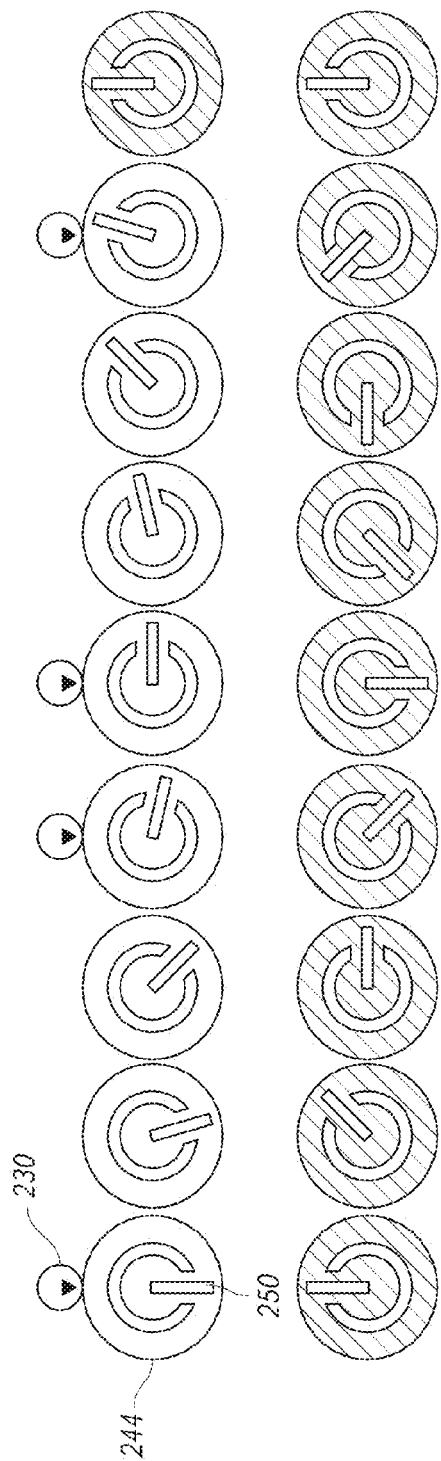
FIG. 9 shows a series of "snapshots" of a trigger mechanism for the purpose of discussing the timing for user "hold" actuation of a hold-timing cue icon.

FIG. 9 is provided to facilitate a discussion of a "hold" actuation of the hold-timing cue icon 244 by causing the cursor indicator mechanism 200 to interact and stay interacted with ("hold") the hold-timing cue icon 244. A hold-timing cue icon 244 may have a special color, size, shape, label, or other characteristic to distinguish it from other timing cue icons 240. A hold actuation differs from a tap actuation because the hold actuation instructs a user to continue to actuate or hold position until the completion of the rotation of the clock "power symbol" on the hold-timing cue icon 244. FIG. 9 includes two "lines" in which the top line is read left-to-right and then the bottom line is read left-to-right. The user actuates the hold-timing cue icon 244 when the time hand 250 is positioned in the home position (hold-timing cue icon 244 on the right of the top line). Then, the time hand 250 begins to rotate 360 degrees (preferably in the reverse direction) until reaching home position once again. During this rotation the user is instructed to hold position in the area they previously actuated. The entire period of the hold would be considered to be part of the actuation state. The hold-timing cue icon 244 may also change color (or another characteristic) to indicate the user's interaction as either a successful holding or an unsuccessful holding. The user's actuation may not effect the time hand 250 returning to home position. Once the time hand 250 arrives at home position, the hold-timing cue icon 244 disappears and the holding period is over. The user continues to the next instruction (provided as a new trigger mechanism 220) in a sequence of instructions. The position cue icon 230 associated with the hold-timing cue icon 244 may also have a special color, size, shape, label, or other characteristic to distinguish it from other position cue icons 230 so that the user is provided with additional notice that the hold-timing cue icon 244 will have different behavior than a standard position cue icon 230. This is an example of how the position cue icon can have an influence on the user(s) behavior of interacting with the hold-timing cue icon.

Figure 10A:
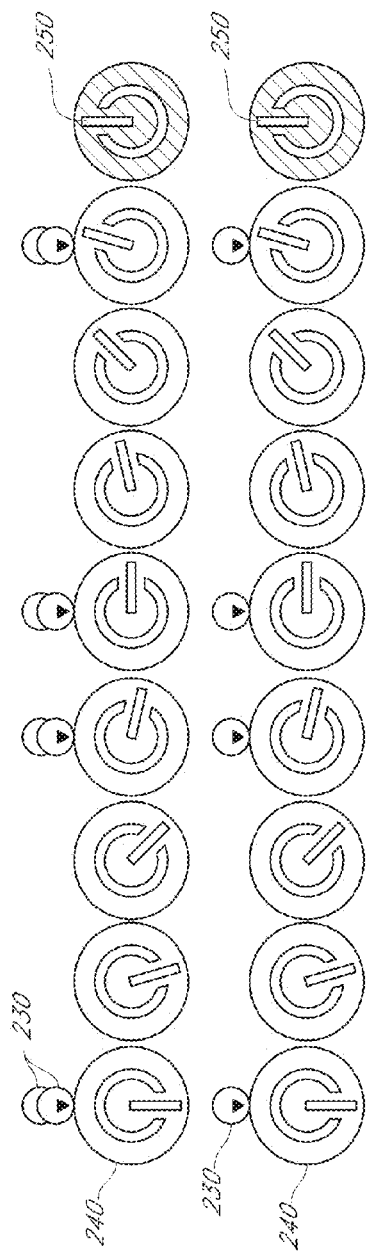
FIG. 10A shows a series of "snapshots" of two stacked trigger mechanisms for the purpose of discussing the timing for sequential user actuation of the timing cue icons.
Figure 12:
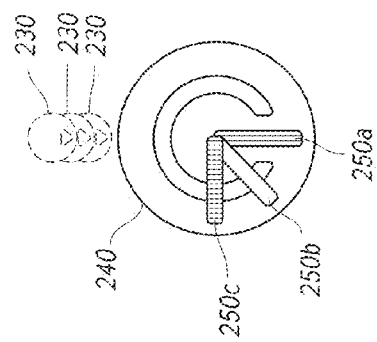
FIG. 12 shows three stacked trigger mechanisms with the time hands of all three trigger mechanisms being visible.

FIG. 10A is provided to facilitate a discussion of the timing for user sequential actuation of multiple, sequential, or repeat actuations (e.g. double taps, triple taps, or double holds (e.g. with a "lift" between the holds)) in the same location or position. FIG. 10A includes two "lines," each line representing a cycle of a separate trigger mechanism 220. On a display device 120 only the first timing cue icon 240 (represented by the top line of FIG. 10A) is visible because the second timing cue icon 240 (represented by the bottom line of FIG. 10) would be positioned "behind" (or "under") the first timing cue icon 240. FIG. 11, on the right side, shows an exemplary appearance of "stacked" timing cue icons 240 to be actuated sequentially. FIG. 12 shows an alternative depiction of stacking in which the time hands 250b and 250c of the timing cue icons 240 "behind" the top timing cue icon 240 are visible. The position cue icons 230 in both FIGS. 11 and 12 are shown as staggered (not overlapping in the entirety) to provide the user notice of the repeat actuations for the stacked timing cue icons 240. Because the position cue icons 230 in FIG. 12 are optional (because the presence of multiple time hands 250a-250c indicates multiple actuations and so they are redundant), the position cue icons 230 are shown in phantom. The staggered position cue icons 230 are not strictly necessary for FIG. 12 because the presence of time hands 250b and 250c would indicate the presence of the stacked timing cue icons 240. Another alternative to the staggered position cue icons 230 would be to have a single position cue icon 230 with a numerical reference delineating the number of trigger mechanisms 220 in the stack. It should be noted that although shown as generic trigger mechanisms 220, the actual timing cue icons may be note-type timing cue icons 240c-240f, tap-timing cue icons 242, hold-timing cue icons 244, follow-timing cue icons 246, or other types of timing cue icons. The behavior of the timing cue icons 240 will depend on the type of timing cue icon it is. The user interaction is repeated until one position cue icon 230 remains (like normal single "actuation" behavior).

Figure 10B:
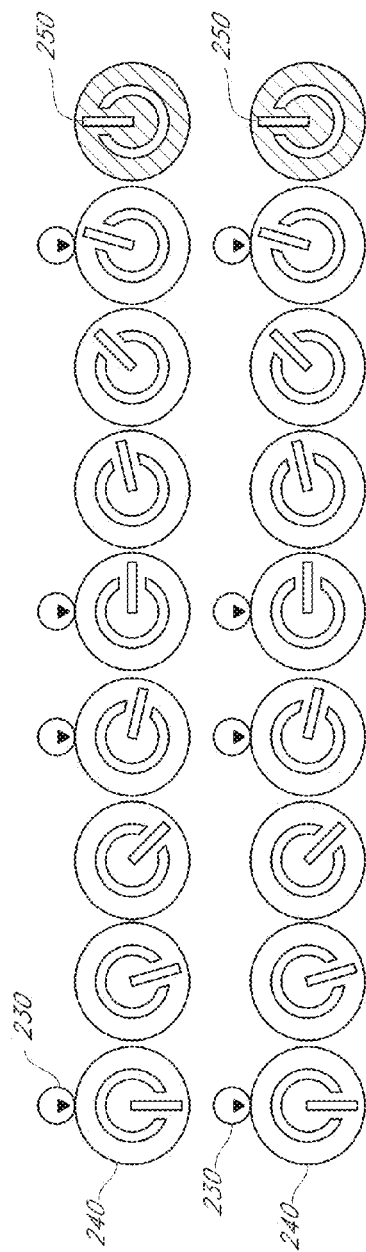
FIG. 10B shows a series of "snapshots" of two adjacent trigger mechanisms for the purpose of discussing the timing for simultaneous user actuation of the timing cue icons.

FIG. 10B is provided to facilitate a discussion of the timing for user simultaneous (omni) actuations (e.g. two simultaneous taps, two simultaneous holds, or two simultaneous follows) in the same location or position. As applied to simultaneous actuations, the two lines of FIG. 10B each represent a cycle of one of the simultaneously displayed separate trigger mechanisms 220. For example, the top line of FIG. 10B may represent the cycle of the trigger mechanism 220 on the left side of the display device 120 shown in FIG. 13 and the bottom line of FIG. 10B may represent the cycle of the trigger mechanism 220 on the right side of the display device 120 shown in FIG. 13. Both first timing cue icons 240 are simultaneously visible. It should be noted that although shown as generic trigger mechanisms 220, the actual timing cue icons may be note-type timing cue icons 240c-240f, tap-timing cue icons 242, hold-timing cue icons 244, follow-timing cue icons 246, or other types of timing cue icons. The behavior of the timing cue icons 240 will depend on the type of timing cue icon it is.

Figure 14:
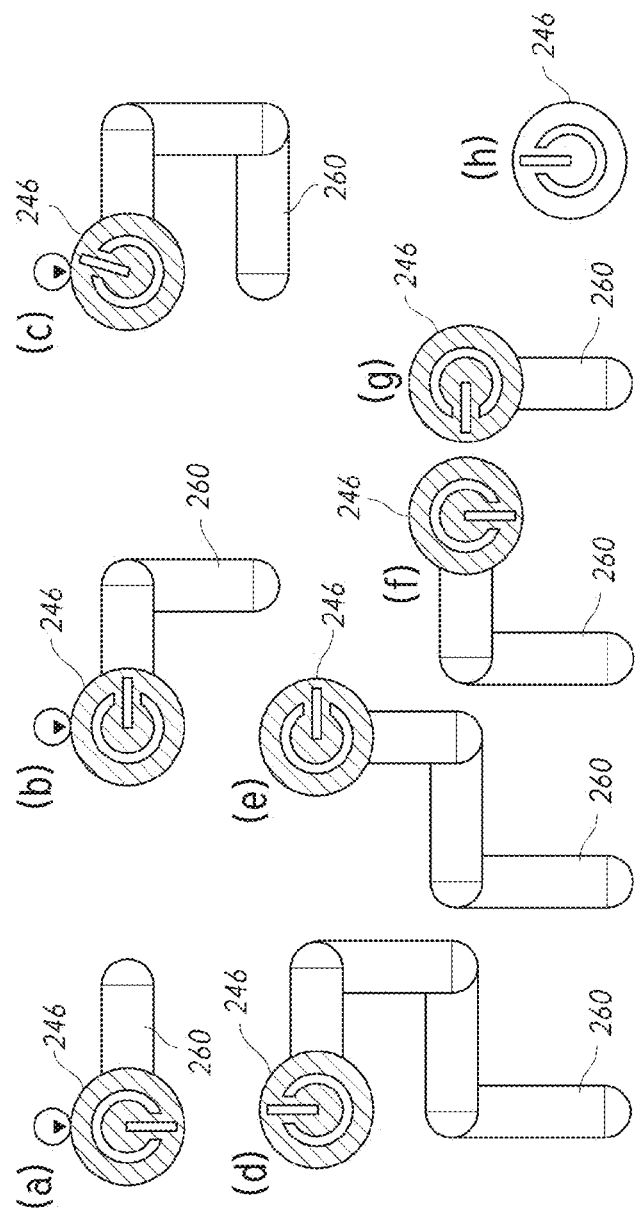
FIG. 14 shows a series of "snapshots" of a trigger mechanism for the purpose of discussing the timing for user "follow" actuation of a follow-timing cue icon.

FIG. 14 is provided to facilitate a discussion of a "follow" actuation of the follow-timing cue icon 246 by causing his cursor indicator mechanism 200 to interact and stay interacted with ("hold") the follow-timing cue icon 246 along a path made of path segments 260. The following may be very short (less than ¼ beat) or very long (longer than 10 seconds). The segments 260 may have a length relating to the beats/time. A follow-timing cue icon 246 may have a special color, size, shape, label, or other characteristic to distinguish it from other timing cue icons 240. The follow-timing cue icon 246 may have a change in characteristic to provide instructions (e.g. flashing to indicate the end of the follow) or feedback (e.g. changing color to indicate an improper follow such as veering off the path). A follow actuation is similar to a hold actuation in that the user continues to actuate (by holding or providing pressure) until the completion of the rotation of the clock "power symbol" on the follow-timing cue icon 246. In addition, however, the user moves (drags) the follow-timing cue icon 246 until the completion of the rotation of the clock "power symbol" on the follow-timing cue icon 246. Using FIG. 14 as an example, an exemplary follow might proceed in the following manner:

a) The follow-timing cue icon 246 appears and the first path segment 260 of the follow path appears.
b) The follow-timing cue icon 246 and/or the time hand 250 rotates towards the home position (shown at 3:00) and the second path segment 260 of the follow path appears.
c) The follow-timing cue icon 246 and/or the time hand 250 rotates towards the home position (currently shown at 1:00) and the third path segment 260 of the follow path appears.
d) The follow-timing cue icon 246 and/or the time hand 250 reaches the home position, the follow path has four visible segments 260, and user can now actuate (because the time hand 250 has reached the home position) the follow-timing cue icon 246 by moving (dragging) it along the follow path. (When the follow-timing cue icon 246 is actuated, the time hand 250 begins rotating (preferably in the clockwise direction).
e) The follow-timing cue icon 246 is at the 3:00 position, and the user continues follow actuating (holding and dragging) the follow-timing cue icon 246 along the follow path.
f) The follow-timing cue icon 246 is at the 6:00 position, and the user continues follow actuating (holding and dragging) the follow-timing cue icon 246 along the follow path.
g) The follow-timing cue icon 246 is at the 9:00 position, and the user continues follow actuating (holding and dragging) the follow-timing cue icon 246 along the follow path.
h) The follow-timing cue icon 246 is at the 12:00 position and has reached the end of the follow path.

The entire period of the follow would be considered to be part of the actuation state. FIG. 14 shows that the path segments 260 that have been passed disappear (or fade), but this is optional. Although not shown in FIG. 14, additional path segments 260 can be added as the user continues follow actuating (holding and dragging) the follow-timing cue icon 246 along the follow path. The user's actuation may not effect the time hand 250 returning to home position. Once the time hand 250 arrives at home position, the follow-timing cue icon 246 disappears and the following period is over. The user continues to the next instruction (provided as a new trigger mechanism 220) in a sequence of instructions. The path segments 260 may have additional indications (e.g. color) that instruct the user on properties of the follow path. For example, the path may be colored to indicate how fast the user should follow actuate (drag). These colors could be coordinated with the colors discussed in relation to FIGS. 4C-4F. Alternatively or in combination, the path segments 260 may include graphical or numerical instructions that indicate, for example, speed, pressure, direction, or other properties. The position cue icon 230 associated with the follow-timing cue icon 246 may also have a special color, size, shape, label, or other characteristic to distinguish it from another position cue icon 230 so that the user is provided with additional notice that the follow-timing cue icon 246 will have different behavior than a standard position cue icon 230. This is an example of how the position cue icon can have an influence on the user(s) behavior of interacting with the follow-timing cue icon.

Figure 15A:
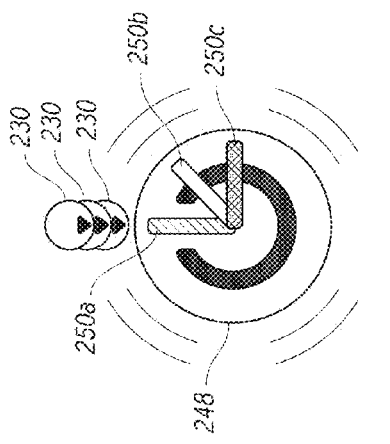
FIGS. 15A-D show a series of "snapshots" of a trigger mechanism for the purpose of discussing the timing for user "track" actuation of a track-timing cue icon.
Figure 15B:
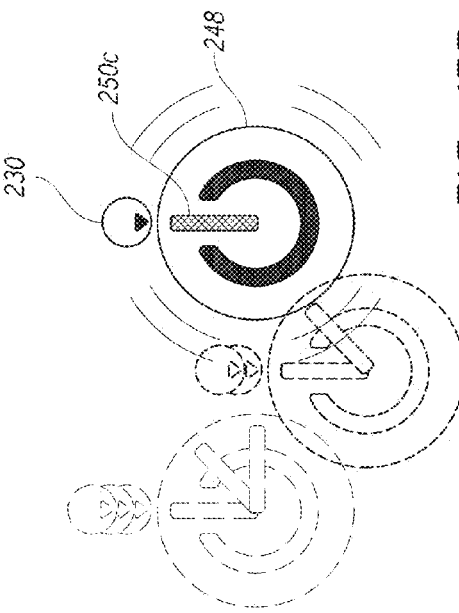
Figure 15C:
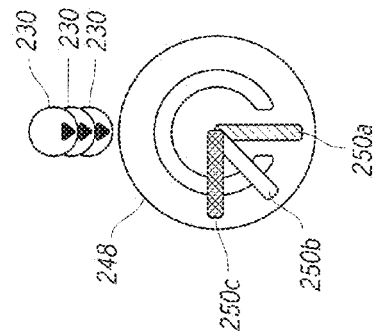
Figure 15D:
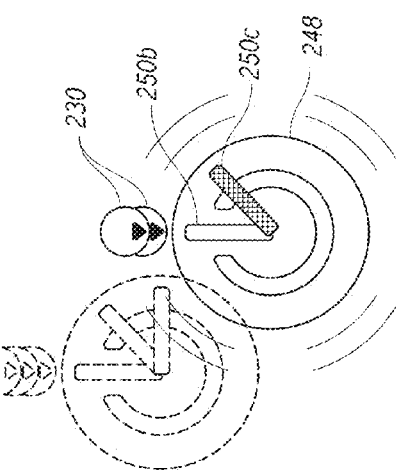

FIGS. 15A-D are provided to facilitate a discussion of a "track" actuation of the track-timing cue icon 248 by causing his cursor indicator mechanism 200 to interact in varying ways with a moving track-timing cue icon 248. The moving may be slow or fast depending on the difficulty of the reaction program. A track-timing cue icon 248 (and/or its associated optional position cue icon 230) may have a special color, size, shape, label, or other characteristic to distinguish it from other timing cue icons 240. The track-timing cue icon 248 may have a change in characteristic to provide instructions (e.g. flashing to indicate the end of the track) or feedback (e.g. changing color to indicate an improper track such as veering off the path). A track actuation is similar to a sequential actuation in that the user makes multiple, sequential, or repeat actuations (e.g. by tapping) as each time hand 250 reaches the home position until the final time hand 250 reaches the home position. In addition, however, the user tracks (chases) the track-timing cue icon 248 as the track-timing cue icon 248 moves from its original position. The user is not dragging the track-timing cue icon 248, the track-timing cue icon 248 is moving on its own. Using FIGS. 15A-D as an example, an exemplary track might proceed in the tracking manner:

a) As shown in FIG. 15A, the track-timing cue icon 248 appears and the presence of three position cue icons 230 and/or three time hands 250 indicates that three actuations will be necessary.

b) The track-timing cue icon 248 and/or the time hands 250 are shown in FIG. 15B as rotated towards the home position until the first time hand 250a reaches the home position and the user actuates the track-timing cue icon 248, for example, by "tapping it." At this stage the track-timing cue icon 248 starts to move.

c) The track-timing cue icon 248 and/or the time hands 250 have continued to both rotate and move. In FIG. 15C the second time hand 250b has reached the home position and the user actuates the track-timing cue icon 248, for example, by "tapping it." This figure also shows a fading version of the track-timing cue icon 248 of FIG. 15B (possibly with feedback) in the location at which it was originally actuated. The track-timing cue icon 248 continues to move.

d) The track-timing cue icon 248 and/or the time hands 250 shown in FIG. 15D have continued to both rotate and move. In this figure the third time hand 250b has reached the home position and the user actuates the track-timing cue icon 248, for example, by "tapping it." This figure also shows fading versions of the track-timing cue icon 248 of both FIG. 15B and FIG. 15C (possibly with feedback) in the location at which they were originally actuated.

The entire period of the track would be considered to be part of the actuation state. The time hands 250 are shown as having additional indications (e.g. color) that may instruct the user on properties of the track-timing cue icon 248. For example, the time hand 250 may be colored to be coordinated with the colors discussed in relation to FIGS. 4C-4F. The optional position cue icon(s) 230 associated with the track-timing cue icon 248 may also have a special color, size, shape, label, or other characteristic to distinguish it from another position cue icon 230 so that the user is provided with additional notice that the track-timing cue icon 248 will have different behavior than a standard position cue icon 230. This is an example of how the position cue icon can have an influence on the user(s) behavior of interacting with the track-timing cue icon.

Scoring

This section is being described in terms of a "game" although other types of reaction programs could have scoring. The scoring may be implemented as a scoring sub-program associated with the reaction program. The reaction program system preferably calculates the "actual score" in real-time. The score and/or other feedback may be presented during use (as a changing score or as points for a particular actuation) or after the play/performance is complete.

Scoring may be based on one or more of the following scoring considerations:

Positional accuracy and/or inaccuracy based on the distance relationship (overlap) between the center of the timing cue icon 240 and the cursor indicator mechanism 200. This would include accuracy and/or inaccuracy on actuations such as taps, holds, follows, tracks, and/or combinations thereof (sequential and simultaneous actuations). For example, did the timing cue icon 240 stay on the path? This may be measured in terms of pixels from timing cue icon 240.

Timing accuracy and/or inaccuracy based on the timing relationship between the time hand 250 of the timing cue icon 240 being at the home position and user actuation (actuating too early, on time, or late).

Rhythm accuracy based on whether the user actuated "to the beat." Rhythm accuracy may also include accuracy of reaction timing (−/+ to sequenced rhythm).

Pressure accuracy based on the pressure or surface-area of the requested tap/actuation.

The experience of the user. Newer users may be given a "break."

The difficulty of the reaction program or sequences. As the user gains experience, he may advance through levels. The levels get progressively more difficult. The user may be awarded more points for harder sequences.

Missed actuations.

Using one or all of these factors, the reaction program provides a game score. FIG. 16 is a flow chart showing the flow for an exemplary scoring sub-program.

"Scoring" may consist of three different elements: (1) actual score per tap (actuation) as described herein (used for high scores etc); (2) experience gained after each song applied toward some sort of "career score"; and (3) "currency" gained after each song that can be spent toward rewards.

At the end of the game, the user is evaluated and scored based on the performance to the desired instructions. This score could provide competition amongst users and a way for the user(s) to see progression of skill overtime.

Comparisons with Prior Art

Unlike programs that recreate and/or emulate the playing of instruments or a device that requires specific hardware, the reaction program system described herein is an adaptable system that can be integrated with or applied to a variety of hardware and software configurations.

The reaction program system provides an innovative way of instructing a user with: X/Y positioning, reaction timing with feedback of actuation while providing indications of velocity sensitive-surface area and user differentiation on a variety of hardware and software configurations that do not require a stationary set of inputs. (In or without relation to music and rhythm.)

The prior art does not provide such visual timing and position based feedback while providing the user with the ability to change positions physically or virtually while engaged with reaction timing that relate to music (or do not relate to music).

The reaction trigger mechanism described herein eliminates the need for multiple shapes or "more than two objects that match/overlap/mate/interact" with regards to a "non-changing and scrolling location" to show an "activate timing period" in relation to music or without relation to music.

The reaction program system can be adapted for competition (or cooperation) for user(s) indefinitely because people easily relate to reaction based games with and without regards to rhythm and music.

The reaction program system provides alternatives that help and solve lack of innovation in real-time reaction, instruction, and evaluation techniques for a variety of input/apparatus and user configurations.

Details of Implementations of Exemplary Reaction Program Systems

The timing, display, and scoring logic of the reaction trigger mechanism 220, as well as other features, may be implemented in software using known programming techniques and commercially available software compatible with the platforms 100 chosen for a specific implementation. The features of the game device can be implemented on multiple platforms and user interface devices 130.

The timing of the reaction program may be implemented based on "beats." Beats refer to musical timing; there are four beats to every measure. Using 130 bpm (beats per minute) as an example: dividing that into four beats (4 beats=1 bar), one beat lasts for 462 ms. Beat one would land on 0 ms, beat two would land on 462 ms, beat three would land on 923 ms, beat four would land on 1385 ms, and beat five would land on 1846 etc. This exemplary beat structure places the beats 462 ms apart. If another bpm (e.g. 65 bpm) was used, then each beat would have a different duration (e.g. for the 65 bpm, the duration would be 923 ms). The timing cue icon 240 may be visible for 4 beats (1 bar). Using this example, the timing cue icon 240 fades in and is stationary in the beginning position (shown as 6:00) during beats one and two. Then, on beats three and four the indicator rotates counterclockwise toward the home position (shown as 12:00). The user ideally actuates the timing cue icon 240 when it is in the home position. As the timing cue icon 240 passes through the home position, it may change one of its characteristics (e.g. it may change color or be highlighted). When the user actuates the timing cue icon 240, the timing cue icon 240 will "freeze" (hold position for 68 ms or other predetermined duration) and then disappear, "pop," or fade out. This means that it is possible for the indicator to fade out before it reaches the home position. The indicator may continue rotating if the user has not actuated it.

If not actuated, the timing cue icon 240 may still fade out over a longer duration (e.g. 270 ms) as it continues to rotate past the home position; the fading may start just after the time hand 250 reaches the home position. The change of characteristic (e.g. flash to white) may begin 34 ms before the time hand 250 reaches the home position and end 34 ms after the time hand 250 reaches the home position for a total of 68 ms. Preferably the change in characteristic (e.g. the white flash) is the same duration (in ms) as a perfect score (a predefined set time). The maximum bonus score for timing is hitting the timing cue icon 240 exactly at the home position +/−34 ms. Therefore, if the timing cue icon 240 "freezes position" during the changed characteristic (e.g. while it is white), the user is provided with positive feedback making them aware of a perfect actuation.

In a preferred reaction program system, timing cue icons 240 ("notes") are stored in a data file that contains the list of timing cue icons 240 to be displayed. Individual timing cue icon data contains the x,y coordinates in space to place the timing cue icon 240. Individual timing cue icon 240 data contains a floating point number that represents the beat value that is the rhythmic count offset from the start. Timing cue icons 240 are loaded into a sequencer and sorted in order of beat within the sequence.

Upon start, a counter in time is started and passed into the sequencer to update the sequencer for timing cue icon 240 playback. The sequencer converts the current time in seconds to elapsed beats based on a specified BPM (beats per min) value assigned in the data that represents the sequence of timing cue icons 240. For the list of timing cue icons 240 that have yet to be created, the elapsed beats value is compared to the beat value of the timing cue icons 240 in the list. If the beat is greater than or equal to the beat less a full 4 beats (this to create lead time), then the timing cue icon 240 is created in the form of a game object which is the embodiment of the visual timing cue icon 240 on screen to the user. The timing cue icon 240 is positioned in the play space and is now its own entity processing logic of the self-contained lifetime. The timing cue icon 240 will begin in a deactivated ready state which is completely disabled from the user view. The timing cue icon 240 is continually sent a processing delta time at which it will tick the internal logic for every timing cue icon 240 currently existing in the play space. A timing cue icon 240 begins in an inactive state that is hidden to the user. The timing cue icon 240 will begin to rotate and fade in so that by rotating in time with the beat the indicator bar of the timing cue icon 240 will reach the 12 o'clock position by the time the defined beat of timing cue icon 240 is matching that of the current beat within the sequence playback. Once and if the timing cue icon 240 rotates past the home position it will begin to fade out as it ends its life-time at which the timing cue icon 240 is removed from existence in the play space and no longer processed.

When the user clicks/touches the screen area, for that x,y position the "top most" timing cue icon 240 (i.e. the timing cue icon 240 with the longest lifetime) that is currently active and within the target radius of the click/touch is located. This touch notification is passed to the timing cue icon 240, if the timing cue icon 240 is in a state that accepts judgment it will record the input and process the scoring value.

Timing cue icon 240 Rotation Code: This is the code that rotates the timing cue icon 240 in step with the beat timing so that the rotation meets the home position in time with the beat. In the code the input 'rotationTimer' is the elapsed time in seconds that the timing cue icon 240 has been rotating. 'beatTimeSlice' is the amount of time in seconds between 2 beats for the given tempo. Based on the amount of time to for 4 beats the elapse a percentage of how far in the rotation the current for the given input is figured. The transformation of the timing cue icon 240 is set back to the base orientation then rotated by the amount to get to the current orientation for the give input.

```
private void ApplyRotationState(float rotationTimer, float beatTimeSlice)
{
   float totalSpinDuration=(beatTimeSlice*4.0f);
   if (totalSpinDuration>float.Epsilon)
   {
      float spinPct=(Mathf.Min(rotationTimer, totalSpinDuration)/totalSpinDuration);
      float totalRotation=360.0f;
      float rotationAmt=-(totalRotation*spinPct);
      //Set back to the base orientation and then rotate to the current position.
      Quaternion target=Quaternion.Euler(270, -90, 90);
      TransformCached.rotation=target;
      TransformCached.Rotate(0, rotationAmt, 0);
   }
}
```

Exemplary Preferred Reaction Program Systems

The reaction program system described herein may be implemented as a game (or game reaction program system). The exemplary preferred game reaction program systems are designed to test, challenge and provide assessment of a user's visual reaction time in a variety of ways. The reaction trigger mechanism described herein can be configured in a variety of ways with or without synchronized music to enhance the experience.

Features of the Exemplary Preferred Game Reaction Program System

The exemplary preferred game reaction program may include one or more of the following features:

A user interface device. Exemplary user interface devices include one or more of the following: a touch screen or multipoint touch screen (that may be associated with the display device 120 such as in handheld gaming devices, tablets, and smart phones), controllers (e.g. a joystick, a computer mouse, keyboard, directional arrow buttons, or console controller), a sensor mat (e.g. touch pads, step pads, and/or any interactive surfaces with input sensors that may be positioned in an array and that the user can activate with, for example, his feet or hands), a microphone, a camera, a motion detector, and/or any other device known or yet to be discovered that is capable of receiving and converting user interaction from physical to "virtual" so that it can be input to the reaction system platform computer 110 (processor) and interpreted by the exemplary preferred game reaction program system.

Software programmed (for example, in C programming language) to manipulate the tap-timing cue icons 242 and provide a reaction trigger mechanism to users. The users actuate according to the type of user interface device (for example, if the users are using an actuatable dance floor, they move their bodies on the dance floor surface to actuate, if the users are using a touch screen device, they use their fingers to actuate, and if the users are using a Mac or PC application, they use a mouse and/or keyboard to actuate). Additionally, the software provides scoring and real-time visual feedback for the user's performance based on the trigger mechanisms. The software interacts with the users and provides an easy-to-understand interface and/or operating system to navigate the game reaction program system.

A visual display device 120 that displays the software game display 400, including the in-game screen and various menus. Exemplary display devices 120 include large 50 LCD/LED TVs, projectors, mobile device screens, and computer monitors that project the software instructions visually so that the user has instructions and feedback during the game. The visual display is preferably located directly in front of the user and is preferably viewable comfortably from a variety of destinations.

Audio entertainment equipment capable of playing dance music that is synchronized with the instructional indicia from the software. The audio preferably provides auditory enhancement to the visual tap-timing cue icon 242 instructions and provides the user with an additional auditory cue that coexists with the visual indicia. If desired, the music may be provided in a digital file that is called upon by the software.

Additional touch screen or button control apparatus for navigation of the software by hand (for example, when the user interface device 130 is an actuatable dance floor). This allows the user to choose desired instructions that could be associated with a particular music and/or audio cadence. The user navigates the interface provided to select music/sequences or activates extra features that could challenge or enhance the game play. This provides the user(s) with the ability to setup game play and experience the game play in standalone way without the aide of an expert. After setup, the user(s) experience game system with the actuatable dance surface.

Stand Alone Amusement Game with Actuatable Dance Floor

An exemplary configuration of the exemplary preferred game reaction program system uses an actuatable dance floor as a user interface device 130. The actuatable dance floor uses a surface or mat that is arranged in an X/Y grid array that is capable of sensing pressure and current position of the user. The actuatable dance floor could be shared amongst multiple users for an interactive experience that is either cooperative or competitive to each user. The users actuate positions of the actuatable dance floor with their feet. This may be very challenging and/or demanding on the users based on the speed and/or reaction time required by the trigger mechanism. The users interact with the display device 120 and associated software by placing feet in the desired position(s) and timing(s) provided by the software. This exemplary configuration provides the user(s) with the additional benefit of exercise while enjoying the game reaction program system experience.

In this exemplary configuration, the dance floor serves as the user interface device 130, and provides a feedback signal to the software giving data about the user's contact and position on the actuatable dance floor. The display device 120 (e.g. a TV or projector) displays the tap-timing cue icons 242 to the user, and also displays the current location symbol showing the user's current contact points. The game can be configured so that the tap-timing cue icons 242 on the display device 120 represent absolute points on the dance floor or relative distances from the current locations at which the user is standing or otherwise contacting the actuatable dance floor.

Stand Alone Amusement Game with Touch Screen or Touchpad User Interface

A first alternative configuration of the exemplary preferred game reaction program system provides the game experience without the use of an actuatable dance floor. Instead, the user interacts with the software by touch screen or by touch pad by placing fingers in the desired position(s) and timing(s) provided by the software.

The first alternative configuration provides the users with game play that is based on hand eye coordination and is not limited by possible factors associated by the use of feet. The first alternative configuration thus provides the ability for users to experience game play who may not be capable of using their feet. Additionally, the first alternative configuration allows the game reaction program system to be compatible with possible space limitations.

iPhone/Mobile Phone Application

In a second alternative configuration of the exemplary preferred game reaction program system, an iPhone software application provides tap instructions to the user. The software manipulates the tap-timing cue icons 242 and the user uses fingers to actuate the touch device based on the placement instructions. The user selects from a list of music or possible predetermined sequences that are associated with particular patterns. The iPhone plays music or auditory cadence with the visual placement instructions provided by the tap-timing cue icons 242.

Computer Mac/PC Application

In a third alternative configuration of the exemplary preferred game reaction program system, a home computer software application (developed, for example, in C programming language) provides a cadence of instructions to the user. The software manipulates the tap-timing cue icons 242 and the user uses a mouse/keyboard to actuate based on the displayed instructions provided by the software. The user selects from a list of music (if desired) or from a list of possible predetermined sequences that are associated with particular patterns. The software plays music or auditory cadence with the visual placement instructions provided by the tap-timing cue icons 242. During game play, the user is provided with real-time feedback based on their actuations associated with the software instructions.

Game Play Using a Standard Computer Mouse and Keyboard User Interface Device

When a user is navigating the game system interface on a standard PC and/or computer interface (e.g. when the user is limited to a mouse and keyboard as the user interface device 130), taps are shared between the mouse and the keyboard. For example, the user could steer the mouse cursor inside the interface (steering towards tap-timing cue icons 242) and various keyboard keys could control the actuations. One possible combination could include using a SPACE BAR as the "press" input and a mouse or touch-pad for steering across the X/Y grid. The position cue icon 230 behavior would be normal with the addition of appearing above each additional keyboard character that must be actuated.

Double taps and omni taps affect game play differently (due to the multiple and simultaneous actuation points). This effect makes it necessary for the user to interact with multiple tap-timing cue icons 242 being displayed at the same time. In order to actuate multiple tap-timing cue icons 242 at the same time, the user can actuate a "shared double tap-timing cue icon 342." The shared double tap-timing cue icon 342 connects the two points and provides the user with a single "centered" actuation point that is located between the normally displayed multiple tap-timing cue icons 242.

The shared double tap-timing cue icon 342 may also have visible connectors to the individual tap-timing cue icons 242 that may be light in color and/or contain "dashed" borders wrapping in an "oval" pattern around the centered shared double tap-timing cue icon 342. This could also be described as a "beam of light" that connects the entire group of tap-timing cue icons 242, 342. These "spot lights" would outline the shared double tap-timing cue icon 342 to demonstrate the single tap-timing cue icon 242 having an effect on the "shared" icons.

The user is scored specifically on the timing and position accuracy for the single "centered" tap-timing cue icon 242. In addition, the score is now multiplied depending on the number of tap-timing cue icons 242 being represented. Thus the same possible score exists in all formats and ports of this reaction program system.

The shared double tap-timing cue icons 342 and shared omni tap-timing cue icons 344 are non-intrusive to the user and replace normally displayed simultaneous tap-timing cue icons 242. The shared double tap-timing cue icons 342 and shared omni tap-timing cue icon 344 appear in the same shape and/or skin as the highlighted centered tap-timing cue icon but would be non-moving and may appear as "ghost shapes."

The "theory" of the shared double tap-timing cue icons 342 and shared omni tap-timing cue icon 344 is to "connect" all displayed shapes to a single activation point. Additionally, this connecting concept provides specific "inputs" to instruct the user to actuate multiple keys on the keyboard to simulate activating more than one tap-timing cue icon 242. The shared double tap-timing cue icons 342 and shared omni tap-timing cue icon 344 follow the standard sequence instructions programmed that normally indicate a double tap or omni tap that is normally indicated by multiple tap-timing cue icons 242. This behavior is usually only applied if the user input is limited to a non-multi touch (multi-input) interface.

The above procedure provides a solution for users that may operate different hardware user interface devices or configurations. This method provides the ability for a user(s) to interact and activate simultaneous actuation instructions and not be limited to hardware that typically provides single actuations.

Figure 17:
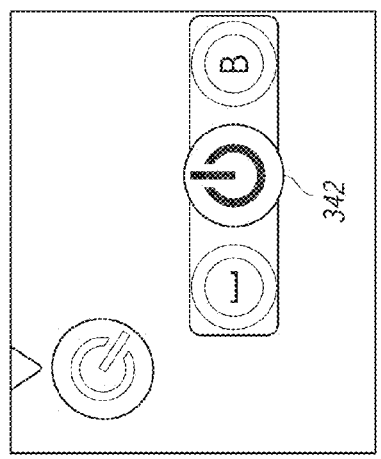
FIGS. 17 and 18 are screenshots of exemplary game play using a standard computer mouse and keyboard as the user interface device.

The keyboard characters provide an additional method for double tapping and omni tapping if they were labeled to instruct the user toward specific key combinations. For example, the user may actuate keys at the same time (within 34 ms of each other) to actuate the double tap. As seen in FIG. 17, the shared double tap-timing cue icon 342 is centered between these two characters. These tap timing cue icons appear and behave as normal tap-timing cue icons 242, with the exception that the user must press the specific instructed keys for actuation (labeled in FIG. 17 as "SPACE BAR" and "B," respectively). To actuate the double tap, the user steers the mouse cursor to the shared double tap-timing cue icon 342 and presses the buttons indicated on the labeled tap-timing cue icons 242.

FIG. 17 shows an exemplary display in which the user is instructed to actuate a double tap by pressing "SPACE BAR" and "B" on the keyboard as they steer the mouse towards the single displayed tap-timing cue icon.

Figure 18:
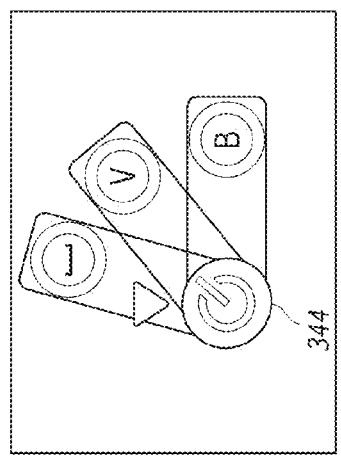

Omni tapping is performed analogously to double taps, with the exception of having three or more tap-timing cue icons 242 to actuate. The three or more single tap-timing cue icons 242 have a single connected shared omni tap-timing cue icon 344. FIG. 18 shows an exemplary display in which the user is instructed to actuate an omni tap (in this case, a triple tap) by pressing "SPACE BAR," "V," and "B" on the keyboard as they steer the mouse toward the single displayed tap-timing cue icon.

Another possible use would be to provide a settings menu that allows assignable settings for users to be able to assign their input of choice (keyboard character, mouse button, etc.). The user would not be able to set the same key multiple times.

"Holds" are performed when a user needs to hold down pressure after the initial tap. A user may only need to hold for a fraction of a second or for many seconds depending on the length of the hold. Holds look similar to taps however they may have different position cue icons 230. The position cue icons 230 used with holds are red instead of the usual yellow. (They are red to alert the user that a hold is requested and not the usual tap-timing cue icon 242.)

In addition, the word static "hold" will be shown above the position cue icon 230 to further warn the user that a hold is present. Once the user has tapped on the hold successfully, the hold will turn white and rotate clockwise for one full rotation. The word "hold" animates and turns white to further indicate that the hold is being depressed correctly. (See FIG. 19).

If the user is not actuating the hold for the duration of the instructed time, the word "miss" would appear to indicate the user is missing the hold sequence. In addition the solid white circle and line portion of the timing cue icon 240 will turn black. (See FIG. 20).

As stated above, there are different graphics used for the success or failure of a hold. The failure graphics will only appear for the sections that were missed (e.g. the user successfully taps the first part of the hold, releases for ½ second, and once again successfully depresses the hold). In this example, the hold will begin to show the graphics for success, then toggle to the graphics for failure, then once again show the graphics for success. Further, the failure graphics will only be displayed after 200 ms of continuous non-actuation of the hold. Therefore, a user that taps very quickly on a hold will then still get full credit for the hold.

The speed at which the timing cue icon 240 rotates depends on the length of time the user is instructed to continue to depress the hold. The hold will rotate 360 degrees regardless of how long the user is instructed to hold. Thus a ¼ second hold will be displayed by a rapid rotation in ¼ second, while a 10 second hold will be displayed by a very slow 10 second rotation.

Transition of success to failure: When the user releases the hold, the timing cue icon 240 will start to change from white (as shown) back to the regular color of the timing cue icon 240 during a hold (the below example would be red, this color is based on note type (e.g. quarter, eighth, etc.)). The change from white to red begins after 34 ms of non-activation and completes at 200 ms of non-activation. (See FIG. 21).

Game Display

Figure 19:
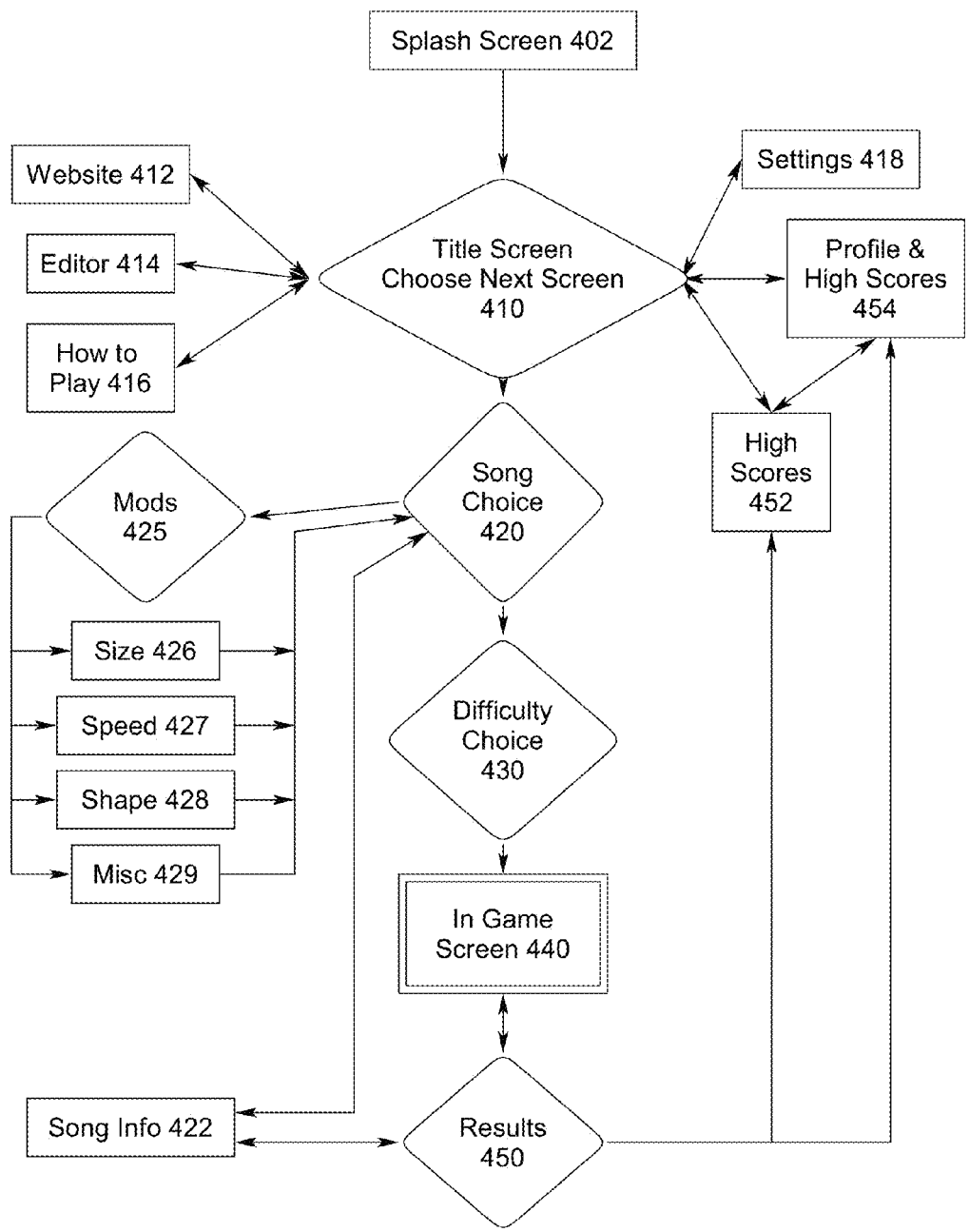
FIG. 19 is a flowchart showing an exemplary screen flow for the game display of an exemplary preferred game reaction program.

Exemplary screen flow for the game display 400 of the exemplary preferred game reaction program is shown in FIG. 19.

The game display 400 includes a splash screen 402, a title screen 410, a song choice menu 420, a difficulty choice menu 430, an in-game screen 440, a results screen 450 and various submenus and/or subscreens. When the exemplary preferred game reaction program system 400 is loaded (for example, on a computer), an initial splash screen 402 (i.e. a loading screen) is displayed on the game display 400 until the associated memory finishes loading the title screen 410.

The title screen 410 displays the title of the game and a menu. The menu of the title screen 410 includes the option of starting a game (leading to the song choice menu 420) and may provide additional selections. For example, as seen in FIG. 19, the title screen 410 menu may include selections that lead to an associated website 412 (for example, providing information about the game reaction program system), an editor 414 (allowing a user to edit trigger mechanism sequences, songs, etc.), "How to Play" instructions 416, settings 418, high scores 452, and profile high scores 454. When the user makes the selection to start a game, they are lead to the song choice menu 420.

The song choice menu 420 displays a variety of songs (representing corresponding sequences) and other menu options. The song choice menu includes the option of selecting a song (leading to the difficulty choice menu 430) and may provide additional selections. For example, as seen in FIG. 19, the song choice menu 420 may include selections that lead to a submenu of song information 422 or a submenu of "mods" 425 (modifications to the game display 400). The mods submenu may include the selections to modify various features of the game display 400 (for example cue icon size 426, sequence speed 427, cue icon shape 428, and/or other miscellaneous modifications 429). When the user selects a song, the game display leads 400 to a difficulty choice menu 430.

The difficulty choice menu 430 displays selections for the difficulty of the sequence associated with the chosen song. Exemplary difficulty choices include "easy," "medium," and "hard," but additional and/or other difficulty choices may be used. Once the user has made a difficulty selection, the game display 400 loads the in-game screen 440.

The in-game screen 440 provides the visual display of the reaction program system 400. The game play experience starts and the users actuate in response to the trigger mechanism 220. The software plays music or auditory cadence with the visual placement instructions provided by the tap-timing cue icons 242. During game play, the user is provided with real-time feedback based on their actuations associated with the software instructions. When the sequence is finished, the game display 400 loads the results screen 450.

The results screen 450 displays the score based on the user's performance during the sequence and a results screen menu. The results screen menu includes the selections of song information 422, high scores 452, and profile high scores 454 (e.g. long-term high scores based on unique user profiles). After the user has viewed the high score screen, the game display 400 reloads the title screen 410. The user can then choose whether to start a new game.

All foreign and/or domestic publications, patents, and patent applications cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention using various alternatives, modifications, adaptations, variations, and/or combinations and their equivalents. It will be appreciated by those of ordinary skill in the art that any arrangement that is calculated to achieve the same purpose may be substituted for the specific embodiment shown. It is also to be understood that the following claims are intended to cover all of the generic and specific features of the invention herein described and all statements of the scope of the invention which, as a matter of language, might be said to fall therebetween.

What is claimed is:

1. A reaction program system including a reaction program implemented on a reaction system platform, said reaction system platform including a computer, a display device, and a user interface device, said system comprising:
 (a) a timing cue icon displayed on said display device to cue at least one user interaction via said user interface device during use of said reaction program;
 (b) said timing cue icon displayed on said display device to provide instructions pertaining to timing of said user interaction, timing being visually indicated by a symbol showing passage of time;
 (c) said timing cue icon displayed on said display device to provide instructions pertaining to an X/Y position of said user interaction, said X/Y position being visually indicated by the position of said timing cue icon on said display device; and
(d) at least one said timing cue icon being a hold-timing cue icon;
(e) wherein said timing cue icon cues said at least one user interaction when said symbol shows passage of time, and wherein said hold-timing cue icon cues a hold user interaction.

2. The system of claim 1 further comprising at least one feature selected from the group of features consisting of:
(a) a position cue icon displayed on said display device to provide prior notice of a position of said timing cue icon;
(b) said timing cue icon displayed on said display device to provide instructions pertaining to duration of said user interaction, said duration being visually indicated by a characteristic of said timing cue icon;
(c) said timing cue icon displayed on said display device to provide instructions pertaining to pressure of said user interaction, said pressure being visually indicated by a characteristic of said timing cue icon;
(d) a user-controlled cursor indicator mechanism displayed on said display device, said cursor indicator mechanism controlled via said user interface device, said user-controlled cursor indicator mechanism to provide feedback of a proximity of said at least one user interaction relative to said timing cue icon; and
(e) a user-controlled cursor indicator mechanism displayed on said display device, said cursor indicator mechanism controlled via said user interface device, said user-controlled cursor indicator mechanism is a feedback cursor indicator mechanism.

3. The system of claim 1 wherein said symbol showing passage of time is a time hand, said timing for said hold user interaction being visually indicated by movement of said time hand to a home position.

4. The system of claim 1, said hold-timing cue icon to provide instructions pertaining to actuation timing of said hold user interaction by visually indicating timing by said symbol showing passage of time by movement in a first direction, said hold-timing cue icon to provide instructions pertaining to ceasing actuation timing of said hold user interaction by visually indicating timing by said symbol showing passage of time by movement in a second direction.

5. The system of claim 1 wherein said symbol showing passage of time is a time hand, said hold-timing cue icon to provide instructions pertaining to actuation timing of said hold user interaction by visually indicating timing by said time hand showing passage of time by movement in a first direction, said hold-timing cue icon to provide instructions pertaining to ceasing actuation timing of said hold user interaction by visually indicating timing by said time hand showing passage of time by movement in a second direction.

6. The system of claim 1 wherein said timing cue icon is actuatable while it is moving.

7. The system of claim 1 further comprising a plurality of timing cue icons being stacked such that one timing cue icon is a top timing cue icon and at least one timing cue icon is positioned behind said top timing cue icon, each timing cue icon of said plurality of timing cue icons having a symbol showing passage of time, all of the symbols showing passage of time being visible when said timing cue icons are stacked, wherein the visible symbols showing passage of time cue a plurality of user interactions between said user-controlled cursor indicator mechanism and said timing cue icons.

8. The system of claim 1 further comprising:
(a) said symbol showing passage of time being a time hand;
(b) a plurality of timing cue icons being stacked such that one timing cue icon is a top timing cue icon and at least one timing cue icon is positioned behind said top timing cue icon; and
(c) each timing cue icon of said plurality of timing cue icons having a time hand, all of the time hands being visible when said timing cue icons are stacked;
(d) wherein the visible time hands cue a plurality of user interactions between said user-controlled cursor indicator mechanism and said timing cue icons.

9. The system of claim 1 further comprising a user-controlled cursor indicator mechanism displayed on said display device, said cursor indicator mechanism controlled via said user interface device, wherein said timing cue icon cues said at least one user interaction between said user-controlled cursor indicator mechanism and said timing cue icon when said symbol shows passage of time.

10. A reaction program system including a reaction program implemented on a reaction system platform, said reaction system platform including a computer, a display device, and a user interface device, said system comprising:
(a) a trigger mechanism displayed on said display device to cue at least one user interaction via said user interface device during use of said reaction program;
(b) said trigger mechanism comprising a position cue icon and a timing cue icon;
(i) said position cue icon displayed on said display device to provide prior notice of a position of said timing cue icon; and
(ii) said timing cue icon displayed on said display device to provide instructions pertaining to timing of said user interaction, timing being visually indicated by movement of a time hand to a home position; and
(c) wherein said trigger mechanism cues said at least one user interaction when said time hand reaches said home position, and said trigger mechanism is displayed on said display device to cue at least one user interaction while said trigger mechanism is moving from an original position.

11. The system of claim 10, further comprising at least one feature selected from the group of features consisting of:
(a) said timing cue icon displayed on said display device to provide instructions pertaining to duration of said user interaction, said duration being visually indicated by a characteristic of said timing cue icon, said characteristic selected from the group comprised of: (i) color; (ii) shape; and (iii) size;
(b) said timing cue icon displayed on said display device to provide instructions pertaining to pressure of said user interaction, said pressure being visually indicated by a characteristic of said timing cue icon, said characteristic selected from the group comprised of: (i) color; (ii) shape; and (iii) size;
(c) said user-controlled cursor indicator mechanism to provide feedback of a proximity of said at least one user interaction relative to said trigger mechanism; and
(d) said user-controlled cursor indicator mechanism being a feedback cursor indicator mechanism.

12. The system of claim 10 wherein said trigger mechanism includes at least one hold-timing cue icon that cues a hold user interaction.

13. The system of claim 10 wherein said trigger mechanism includes a hold-timing cue icon that cues a hold user interaction, said hold-timing cue icon to provide instructions pertaining to actuation timing of said hold user interaction by visually indicating timing by said time hand showing passage of time by movement in a first direction, said hold-timing cue icon to provide instructions pertaining to ceasing actuation timing of said hold user interaction by visually indicating timing by said time hand showing passage of time by movement in a second direction.

14. The system of claim 10 further comprising:
(a) a plurality of trigger mechanisms, each said trigger mechanism comprising a position cue icon and a timing cue icon;
(b) the timing cue icons being stacked such that one timing cue icon is a top timing cue icon and at least one timing cue icon is positioned behind said top timing cue icon; and
(c) the position cue icons being staggered such that they are not overlapping in the entirety;
(d) wherein the time hand of said top timing cue icon cues the first of a plurality of user interactions between said user-controlled cursor indicator mechanism and said top timing cue icon.

15. The system of claim 10 further comprising a user-controlled cursor indicator mechanism displayed on said display device, said cursor indicator mechanism controlled via said user interface device, wherein said trigger mechanism cues said at least one user interaction between said user-controlled cursor indicator mechanism and said timing cue icon when said time hand reaching said home position.

16. A method for implementing a reaction program system on a reaction system platform, said reaction system platform including a computer, a display device, and a user interface device, said method comprising the steps of:
(a) displaying a timing cue icon on said display device, said timing cue icon providing instructions for both user interaction pertaining to timing and user interaction pertaining to position;
(b) providing instructions pertaining to timing of said user interaction by displaying said timing cue icon on said display device and indicating timing using a symbol associated with said timing cue icon showing passage of time;
(c) providing instructions pertaining to position of said user interaction by displaying said timing cue icon on said display device and visually indicating position by the position of said timing cue icon on said display device;
(d) cueing said user interaction when said symbol shows passage of time; and
(e) said step of displaying a timing cue icon further including the step of displaying a hold-timing cue icon that cues a hold user interaction.

17. The method of claim 16 further comprising at least one step selected from the group of steps consisting of:
(a) displaying a position cue icon on said display device to provide prior notice of a position of said timing cue icon;
(b) displaying a user-controlled cursor indicator mechanism on said display device, said cursor indicator mechanism controlled via said user interface device; and said step of cueing said user interaction when said symbol shows passage of time further comprising the step of cueing said user interaction between said user-controlled cursor indicator mechanism and said timing cue icon when said symbol shows passage of time;
(c) displaying a user-controlled cursor indicator mechanism on said display device, said cursor indicator mechanism controlled via said user interface device, said user-controlled cursor indicator mechanism to provide feedback of a proximity of said user interaction relative to said timing cue icon; and said step of cueing said user interaction when said symbol shows passage of time further comprising the step of cueing said user interaction between said user-controlled cursor indicator mechanism and said timing cue icon when said symbol shows passage of time;
(d) displaying a feedback cursor indicator mechanism on said display device based on said user interaction;
(e) indicating timing using a symbol associated with said timing cue icon showing passage of time further comprising rotating at least a portion of said timing cue icon toward a home position to indicate a virtual countdown;
(f) indicating timing using a symbol associated with said timing cue icon showing passage of time further comprising visually indicating passage of time using a time hand symbol, said timing being visually indicated by movement of said time hand symbol to a home position;
(g) displaying said timing cue icon on said display device to provide instructions pertaining to duration of said user interaction, said duration being visually indicated by a characteristic of said timing cue icon, said characteristic selected from the group comprised of: (i) color; (ii) shape; and (iii) size; and
(h) displaying said timing cue icon on said display device to provide instructions pertaining to pressure of said user interaction, said pressure being visually indicated by a characteristic of said timing cue icon, said characteristic selected from the group comprised of: (i) color; (ii) shape; and (iii) size.

18. The method of claim 16, said step of displaying a timing cue icon further including the step of providing instructions pertaining to actuation timing of said hold user interaction by displaying said hold-timing cue icon and visually indicating timing by said symbol showing passage of time in a first direction, and providing instructions pertaining to ceasing actuation timing of said hold user interaction by displaying said hold-timing cue icon and visually indicating timing by said symbol showing passage of time in a second direction.

19. The method of claim 16, said step of displaying a timing cue icon further including the step of providing instructions pertaining to actuation timing of said hold user interaction by displaying said hold-timing cue icon and visually indicating timing by a time hand symbol showing passage of time in a first direction, and providing instructions pertaining to ceasing actuation timing of said hold user interaction by displaying said hold-timing cue icon and visually indicating timing by said time hand symbol showing passage of time in a second direction.

20. A method for implementing a reaction program system on a reaction system platform, said reaction system platform including a computer, a display device, and a user interface device, said method comprising the steps of:
(a) displaying a timing cue icon on said display device, said timing cue icon providing instructions for both user interaction pertaining to timing and user interaction pertaining to position;
(b) providing instructions pertaining to timing of said user interaction by displaying said timing cue icon on said display device and indicating timing using a symbol associated with said timing cue icon showing passage of time;
(c) providing instructions pertaining to position of said user interaction by displaying said timing cue icon on said display device and visually indicating position by the position of said timing cue icon on said display device;

(d) cueing said user interaction when said symbol shows passage of time when said symbol shows passage of time and while said timing cue icon is moving.

21. A method for implementing a reaction program system on a reaction system platform, said reaction system platform including a computer, a display device, and a user interface device, said method comprising the steps of:
- (a) displaying a plurality of timing cue icons stacked such that one timing cue icon is a top timing cue icon and at least one timing cue icon is positioned behind said top timing cue icon, each timing cue icon of said plurality of timing cue icons providing instructions for both user interaction pertaining to timing and user interaction pertaining to position;
- (b) providing instructions pertaining to timing of said user interaction by displaying said plurality of timing cue icons on said display device and each timing cue icon of said plurality of timing cue icons having a symbol showing passage of time, all of the symbols showing passage of time being visible when said timing cue icons are stacked;
- (c) providing instructions pertaining to position of said user interaction by displaying said timing cue icon on said display device and visually indicating position by the position of said timing cue icon on said display device; and
- (d) cueing a plurality of user interactions using said visible symbols.

22. The method of claim 21,
- (a) said step of providing instructions pertaining to timing of said user interaction further comprising providing instructions pertaining to timing of said user interaction by displaying each said timing cue icon on said display device and indicating timing using a time hand as said symbol showing passage of time; and
- (b) said step of cueing a plurality of user interactions using said visible symbols further comprising cueing a plurality of user interactions using said time hands.

\* \* \* \* \*